United States Patent
Katsube et al.

(10) Patent No.: US 6,501,756 B1
(45) Date of Patent: Dec. 31, 2002

(54) METHOD OF MANAGING HOP-COUNT IN LABEL SWITCHING NETWORK AND NODE APPARATUS

(75) Inventors: Yasuhiro Katsube, Kanagawa-ken (JP); Hisako Tanaka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,737

(22) Filed: Jun. 29, 1999

(30) Foreign Application Priority Data

Jun. 30, 1998 (JP) .......................................... 10-184916

(51) Int. Cl.$^7$ ........................ H04L 12/56; H04L 12/28; G06F 15/173
(52) U.S. Cl. ........................ 370/392; 370/389; 370/354; 370/352; 709/238
(58) Field of Search ................................ 370/392, 389, 370/354, 352; 709/238

(56) References Cited

U.S. PATENT DOCUMENTS

| | | | | |
|---|---|---|---|---|
| 5,363,369 A | * | 11/1994 | Hemmady et al. | 370/392 |
| 5,566,173 A | * | 10/1996 | Steinbrecher | 370/396 |
| 5,835,710 A | | 11/1998 | Nagami et al. | |
| 5,872,783 A | * | 2/1999 | Chin | 370/395.32 |
| 5,917,820 A | * | 6/1999 | Rekhter | 370/392 |
| 5,996,021 A | * | 11/1999 | Civanlar et al. | 370/392 |
| 6,055,561 A | * | 4/2000 | Feldman et al. | 370/220 |
| 6,091,725 A | * | 7/2000 | Cheriton et al. | 370/392 |
| 6,130,889 A | * | 10/2000 | Feldman et al. | 370/389 |
| 6,188,689 B1 | * | 2/2001 | Katsube et al. | 370/252 |
| 6,243,667 B1 | * | 6/2001 | Kerr et al. | 370/379 |
| 6,343,322 B2 | * | 1/2002 | Nagami et al. | 370/395.3 |
| 6,374,303 B1 | * | 4/2002 | Armitage et al. | 370/390 |
| 6,408,001 B1 | * | 6/2002 | Chuah et al. | 370/392 |

OTHER PUBLICATIONS

A. Conta, et al., "Use of Label Switching on Frame Relay Networks," Internet Drafted, printed Dec. 18, 1997.

* cited by examiner

*Primary Examiner*—Krisna Lim
(74) *Attorney, Agent, or Firm*—Foley & Lardner

(57) ABSTRACT

In a label switched path (LSP) including label switching nodes, some of which process a Time To Live (TTL) value of a generic label header and others of which that do not process the TTL value, an adequate hop-count information regarding the LSP is reported from node to node by using a label distribution protocol. A node, which has received a message including a hop-count of the LSP from an upstream node or a downstream node, determines whether or not the node itself is to update the TTL value in a packet if received through the LSP. The node then transmits a message indicating that the hop-count is one or a message including the incremented hop-count, in accordance with this determination, to the downstream node or the upstream node. Thus, upon transferring packets on the LSP, the nodes forming the LSP that process the TTL value can appropriately decrement the TTL value of the packet.

15 Claims, 15 Drawing Sheets

701

| STREAM INFORMATION | OUTPUT I/F | TYPE OF OUTPUT LABEL | VALUE OF OUTPUT LABEL | CoS VALUE | TTL TO BE DECREMENTED |
|---|---|---|---|---|---|
| xx.yy.zz.uu/24 | atm-1 | vpi/vci | 1/123 | 1 | 2 |
| aa.bb.cc.dd/24 | ether-1 | generic label | 9876 | 2 | 1 |
| aa.bb.cc.ee/24 | ether-2 | generic label | 5555 | 2 | 1 |
| pp.qq.rr.ss/26 | fr-1 | dlci | 345 | 3 | 4 |

| INPUT I/F | VALUE OF INPUT LABEL | OUTPUT I/F | TYPE OF OUTPUT LABEL | VALUE OF OUTPUT LABEL | TTL TO BE DECREMENTED |
|---|---|---|---|---|---|
| atm-2 | 1/123 | atm-1 | vpi/vci | 2/7654 | -- |
| ether-1 | 9012 | fr-1 | dlci | 332 | 2 |
| atm-1 | 1/666 | fr-2 | dlci | 590 | 2 (or "--") |

FIG.8

METHOD OF MANAGING HOP-COUNT IN LABEL SWITCHING NETWORK AND NODE APPARATUS

BACKGROUND ART

The present invention generally relates to a hop-count management method and to a node apparatus using this method.

In a node apparatus performing packet communications by using, for example, Internet Protocol (IP), control information for assigning specific labels to specific packet streams can be exchanged between nodes. Each node then, stores input labels (and input interfaces) and output labels (and output interfaces) assigned to the individual streams, and performs a packet transfer operation (switching operation) in accordance with the relationship between the stored input and output labels. This scheme is referred to as a "label switching technique".

Generally, the lengths of the labels are fixed, and faster processing is achieved and more flexible path control is enabled by employing the above-described label switching packet transfer operation than by utilizing a conventional packet transfer operation performed by analyzing packet header information (destination IP address prefix, etc.).

The path through which packet streams are label-switched is referred to as a "label switched path (LSP)". A node, which is located at the ingress of the LSP for transferring a packet stream, is referred to as an "ingress node", and performs packet transfer after analyzing an IP packet which belongs to the packet stream and attaching a label to the packet. A node, which is located at the egress of the LSP for transferring the packet stream, is referred to as an "egress node", and performs packet transfer after removing the label from the received packet. A node, which is placed between the ingress node and the egress node in the LSP so as to connect these nodes, is referred to as an "intermediate node", and performs packet transfer in accordance with the relationship between the input and output labels.

A stream to be transferred in a certain LSP may be various packets, such as a packet provided with a specific destination IP address, a packet provided with a specific destination IP address prefix (network address), and a packet passing through a specific egress node belonging to a certain domain.

LSPs may include at least point-to-point LSPs for unicast streams (one ingress node and one egress node are provided), and point-to-multipoint LSPs (one ingress node and a plurality of egress nodes are provided, and the LSP is branched off at an intermediate node into at least two portions) for multicast streams. Additionally, multipoint-to-point LSPs (a plurality of ingress nodes and a single egress node are provided) may be defined if a stream merge function of relating a plurality of input labels to a single output label is provided in an intermediate node.

To specifically implement the above-described label switching, a header defined in the known datalink switching technique, such as an asynchronous transfer mode (ATM) and a frame relay, may be used. Alternatively, a label header newly defined specifically for label switching may be used.

In the second technique, a label header field (hereinafter referred to as a "generic label header") is inserted between a point-to-point protocol link (PPP link) frame header and an IP header or between a logical link control (LLC) header of a local area network (LAN) and an IP header, and a label value filled in the generic label header field is used as switching information.

In the generic label header, not only a label field used as the switching information, but also a Time-To-Live (TTL) field for checking the number of nodes through which a packet passes (hereinafter sometimes referred to as a "hop-count") and a Class of Service (CoS) field for indicating the priority of performing transfer operation are defined. The TTL field and the CoS field are also defined in a conventional IP packet header. If each node (not only the ingress node and the egress node, but also an intermediate node) decrements the TTL value in the generic label header one-by-one upon transferring a packet by label switching, it is possible to discard the packet which have passed through a number of nodes greater than a predetermined number of nodes due to a reason, such as circling in the transfer path (routing loop).

In contrast, if the aforementioned first technique, i.e., a known datalink switching technique, is used for implementing label switching, a Virtual Path Identifier/Virtual Channel Identifier (VPI/VCI) field of an ATM cell header or a Data Link Circuit Identifier (DLCI) field of a frame relay header may be used as a label field.

In this case, a standardized ATM cell header format or frame relay header format is used, but the TTL field and the CoS field discussed previously are not defined for these header formats. Accordingly, once a packet (cell) is input into an LSP formed by the ATM virtual connection (VC), it may not be discarded and circles indefinitely in the LSP due to, for example, routing loop.

As one of the measures to overcome the above-described drawback, the following method has been proposed. By using a Label Distribution Protocol (LDP) for establishing, maintaining, and releasing an LSP, the number of nodes through which a packet passes (the hop-count) in each LSP from an ingress node to an egress node is stored in the ingress node or in the egress node. Then, when a packet is actually transferred, the TTL value of the IP packet header is decremented by the hop-count stored in the ingress node or the egress node.

In this method, the ingress node transmits a "label request message" for requesting an assignment of a label to a specific packet stream defined by, for example, a destination network prefix. Then the downstream node receives the label request message and further transmits it to its neighboring node toward the egress node. In this manner, the label request message is forwarded to the egress node, and the egress node sends back a "label mapping message" for assigning the label to the specific packet stream. Alternatively, the egress node may voluntarily transmit a label mapping message to the upstream node, even if it does not receive any label request message. Then the upstream node receives the label mapping message and further transmits it to its neighboring node toward the ingress node.

The label mapping message transmitted from the egress node includes not only the label value to be informed to the upstream node's, but also the hop-count representing a value of one. When a node receives the label mapping message from its neighboring downstream node, the node transmits the label mapping message to its neighboring upstream node after incrementing the hop-count value by one. Ultimately, the ingress node that has transmitted the label request message receives the label mapping message and stores the hop-count value indicated in the label mapping message, which represents the number of nodes between the ingress node and the egress node.

Then, when the ingress node receives a packet belonging to a packet stream corresponding to the above-described label, it decrements the TTL value of the packet header by the stored hop-count value and checks whether the decremented TTL value has reached zero before transmitting the packet. If the TTL value has reached zero, the packet may be discarded at the ingress node.

The aforementioned method, where the number of hops in the LSP from the ingress node to the egress node is informed to the ingress node by the label mapping messages and the ingress node decrements the TTL value of a packet to be transmitted through the LSP by the informed hop-count value, is effective only when all the intermediate nodes located on an LSP are unable to check and update the TTL value in a packet transferred. That is, it is effective only in a system where all the nodes forming the LSP use the same known datalink switching technique, such as ATM or frame relay.

Considering an actual label switching network, both ATM and frame relay may be employed, or both ATM and a Synchronous Optical Network (SONET)-based point-to-point link may be used, in a single network. However, the control mechanism previously discussed above has been proposed, assuming that one of ATM and frame relay is solely used in the label switching network and that all the intermediate nodes located on an LSP are unable to perform TTL processing.

Consequently, the proposed control mechanism cannot deal with a case where two or more different types of network segments are provided in one LSP, especially where one type of the network segments includes an intermediate node which is able to check and update the TTL field of the generic label header and another type of the network segments includes an intermediate node which is unable to perform TTL processing.

DISCLOSURE OF THE INVENTION

It is therefore an object of the present invention to provide a hop-count management mechanism for enabling each node of the LSP, that transfers a packet by using the label switching technique to appropriately decrement the TTL value, especially in a case where one LSP is established through both a node that can process a TTL value of an IP header or a generic label header and a node that cannot process the TTL value, so that an adequate TTL value, which realizes an interoperablity with a conventional hop-by-hop transfer technique, can be provided in the IP header of the packet output from the egress node of the LSP.

According to one aspect of the present invention, there is provided a method of managing a hop-count value of a label switched path (LSP) which is configured by nodes that perform a label switching operation on an input packet by referring to a correlation between input labels and output labels assigned to a packet stream corresponding to the input packet. In this method, a node, which has received from one of an upstream node and a downstream node a message (for example, the label request message or the label mapping message) including a hop-count of the LSP, determines whether or not the node itself is going to update, upon performing the label switching operation on a packet received, information (for example, the TTL value) included in the packet concerning the number of nodes through which the packet passes.

If the node determines that the information is not to be updated in this node, the node increments the hop-count in the received message by a prescribed value (for example, by one), and then transfers the message to other of the upstream node and the downstream node. This message including the hop-count is preferably received from the downstream node and transferred to the upstream node in a case of establishing a unicast or stream-merge LSP, and is preferably received from the upstream node and transferred to the downstream node in a case of establishing a multicast LSP. If the node determines that the information is to be updated in this node, the node transmits a message indicating that the node itself is going to update the information (for example, a message including a value of one as the hop-count or a message not including the hop-count) to the other of the upstream node and the downstream node.

When the node that determines to update the information by itself receives a packet through the LSP, the node updates the information in the received packet based on the hop-count which has been reported from the one of the upstream node and the downstream node and is stored in the node (for example, the node decrements the TTL value in the packet by a value of the hop-count). In other words, if the one of the upstream node and the downstream node does not have a function of updating the information, the node is supposed to have received the message including the hop-count incremented (for example, two or greater), and thus the node updates the information based on this incremented hop-count.

If the one of the upstream node and the downstream node has a function of updating the information, the node updates the information in the received packet by a predetermined value (for example, decrements the TTL value by one). In practice, the predetermined value may also be stored in the node as the hop-count that is referred to upon updating the information.

According to the principle of the above-described present invention, the upstream node that processes the TTL value can decrement it in advance by the number of hops from that node to a downstream node some hops ahead that subsequently processes the TTL value, for example, in a unicast or stream-merge LSP passing through both a node that is able to process the TTL value of the generic label header and a node that is unable to process the TTL value. Alternatively, the downstream node that processes the TTL value can decrement it later by the number of hops from an upstream node some hops before that previously processes the TTL value to that node, for example, in a multicast LSP passing through the above different types of nodes. As a whole, an adequate TTL value of an IP header, which is equivalent to that will be obtained by a hop-by-hop transfer technique, can be provided for an IP packet output from the egress node of the LSP to a network operated by the hop-by-hop transfer technique.

In the aforementioned method, a node may determine that it is to update the information, when any one of the input label and the output label is set in the same header field (for example, the generic label header field) as the header field in which the information is contained.

A node may determine that it is not to update the information, when both the input label and the output label are set in a header field (for example, a layer-2 header field) different from a header field in which the information is contained. Alternatively, a node may determine that it is to update the information, when neither of the input label nor the output label is set in the same header field as the header field in which the information is contained, but when the type of input label and the type of output label are different (for example, an ATM header and a frame relay header).

According to another aspect of the present invention, there is provided a node apparatus for operating the above-described method.

According to yet another aspect of the present invention, there is provided a computer usable medium having computer readable program code means embodied therein for a computer functioning as the above node apparatus.

Other features and advantages of the present invention will become apparent from the following description taken in conjunction with the accompanying drawings.

Both the foregoing general description and the following detailed description provide examples consistent with this invention and explain how to make and use systems, methods, and articles of manufacture consistent with the invention. These descriptions do not restrict the claimed invention.

BRIEF DESCRIPTION OF THE DRAWINGS

FIG. 7 illustrates an example of a stream information table;

FIG. 8 illustrates an example of a label information table;

DESCRIPTION OF THE PREFERRED EMBODIMENTS

In a network, both ATM and a point-to-point link may be employed. For example, ATM may be used from an ingress node to an intermediate node in an LSP, and a point-to-point link may be used from the intermediate node to an egress node, or conversely, a point-to-point link may be employed from an ingress node to an intermediate node in an LSP, and ATM may be employed from the intermediate node to an egress node. In this case, instead of decrementing the TTL value only in the ingress node by the number of hops from the ingress to the egress node, it is preferable to identify in one LSP a segment which is capable of decrenienting the TTL value and a segment which is incapable of decrementing the TTL value, and that each node located in the LSP informs adequate hop-count information by utilizing a Label Distribution Protocol (LDP) so that other nodes can manage the hop-count information and appropriately decrement the TTL value. A specific hop-count management method is described below with reference to the drawings.

Figure 1:
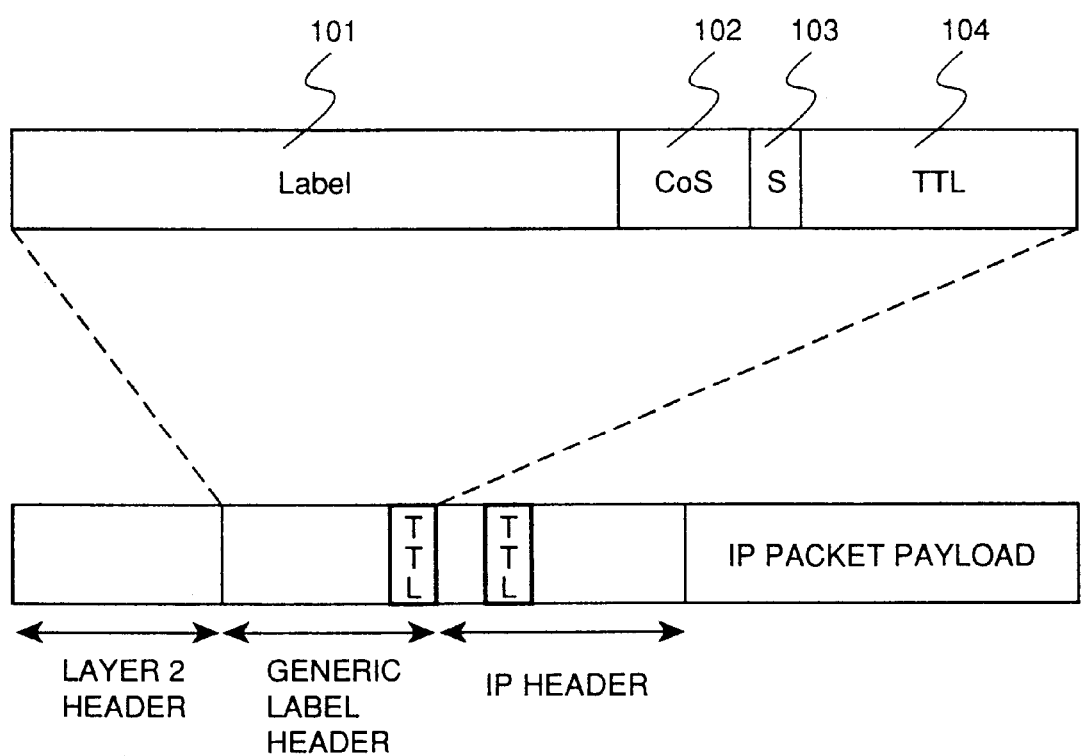
FIG. 1 illustrates an example of the format of a generic label header.

FIG. 1 illustrates an example of the format of a generic label header. A four byte generic label header defined for label switching includes a label field 101, a Class of Service (CoS) field 102, a bottom of stack field 103, and a Time to Live (TTL) field 104.

The generic label header is inserted between a layer-3 header (for example, an IP header) and a layer-2 header (for example, a PPP header, a LAN header such as an IEEE802.3/Ethernet header, a frame relay header, etc.). If the layer 2 is based on ATM, the generic label header is first added to the layer-3 header, which is then provided with an ATM adaptation layer (AAL) trailer. The resulting packet is then formed into ATM cells, and then, cell headers are provided. An ATM cell is a kind of a frame like an Ethernet frame, etc.

A description is given below of a label switching operation performed by the ingress node, the intermediate node, and the egress node, a method for processing the TTL value of the generic label header by some nodes, and a label distribution protocol procedure for enabling such TTL processing, in cases of various types of layer-2 media (datalink).

Figure 13:
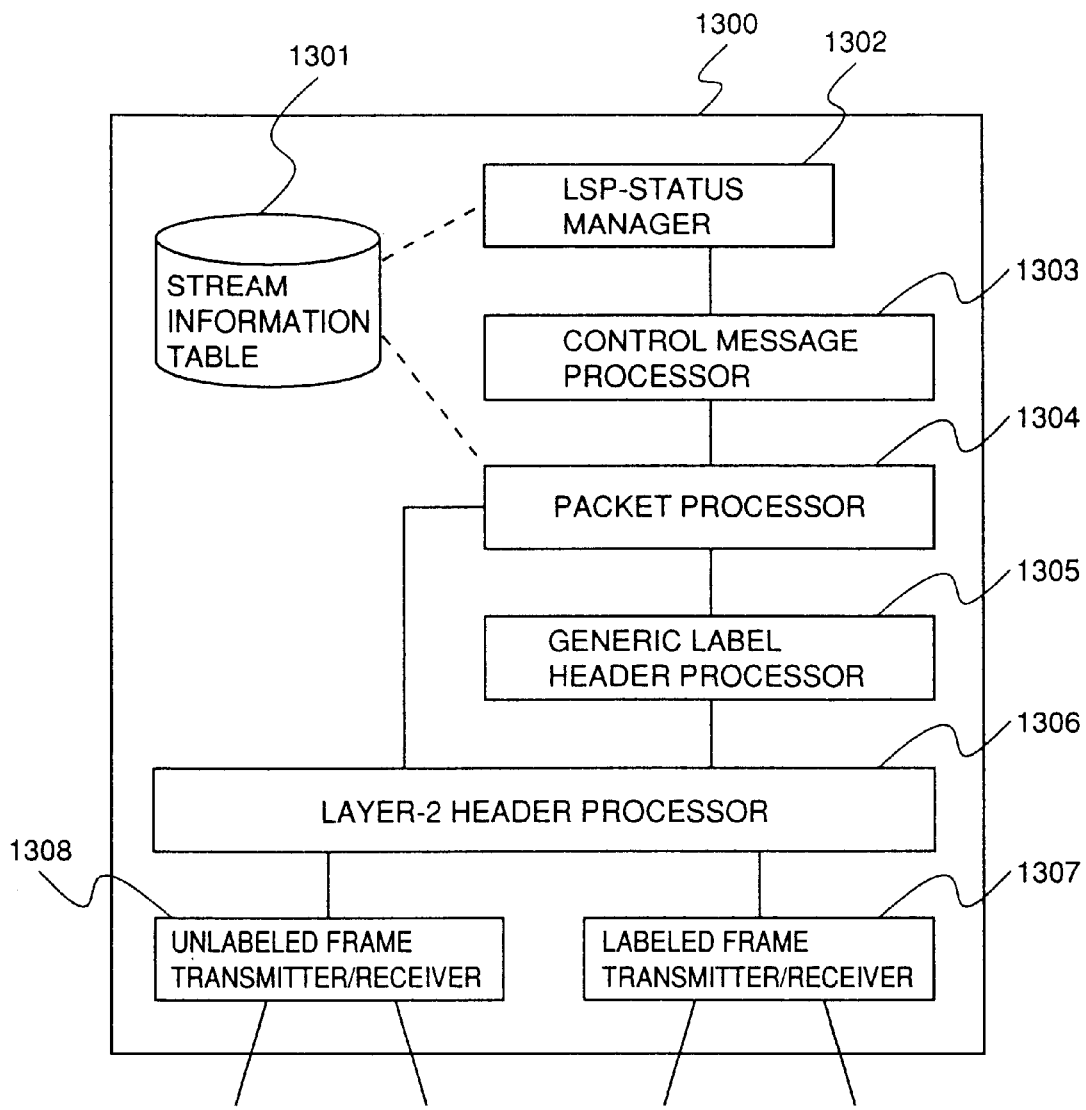
FIG. 13 is a block diagram illustrating an exemplary configuration of an edge node, which serves as an ingress node or an egress node of an LSP.
Figure 14:
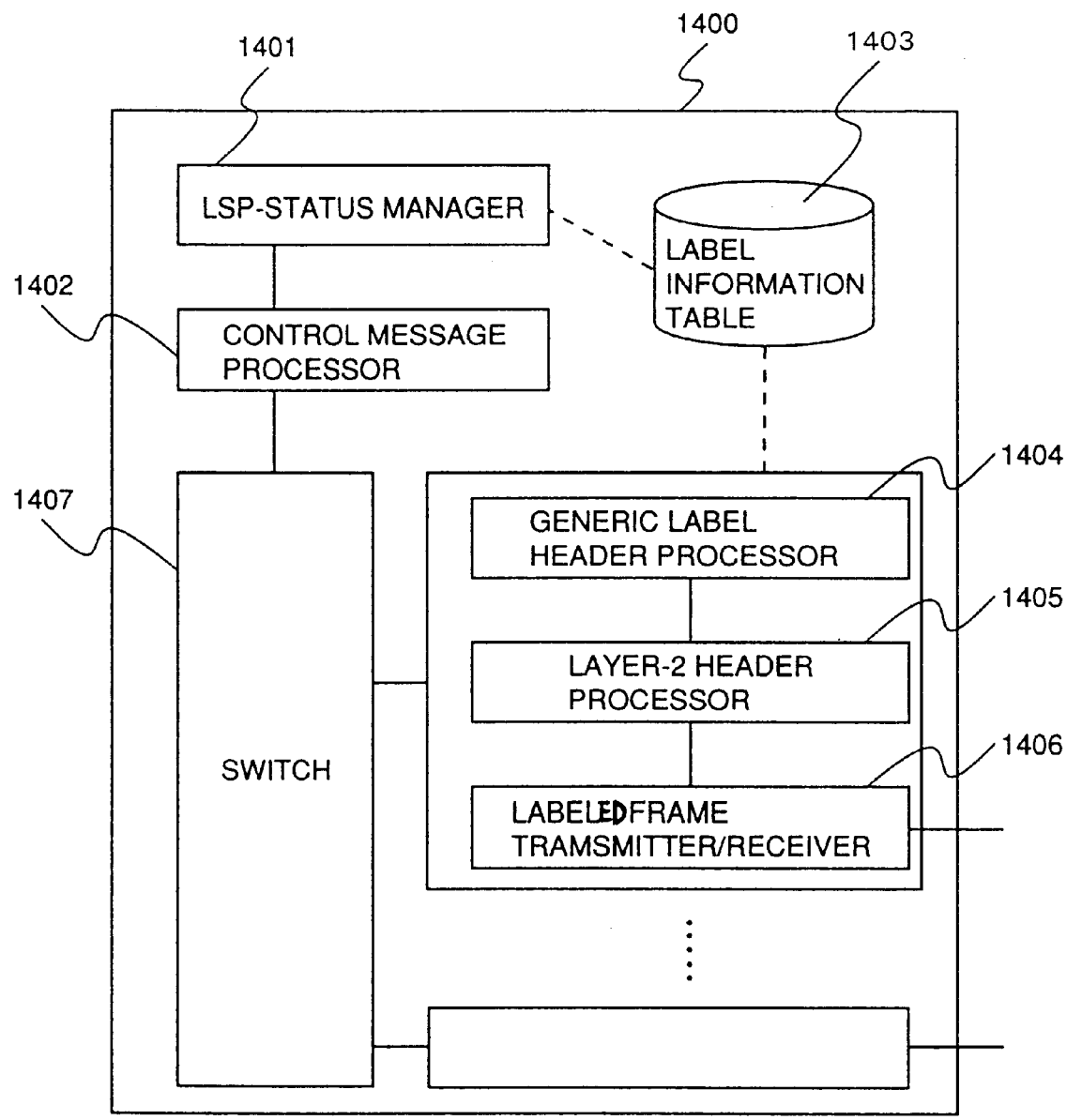
FIG. 14 is a block diagram illustrating an exemplary configuration of a core node, which serves as an intermediate node of an LSP.

An example of the configuration of an edge node, which serves as the ingress node or the egress node of an LSP in this embodiment, is shown in FIG. 13, and a core node, which serves as an intermediate node of the LSP in this embodiment, is shown in FIG. 14.

In an edge node 1300 of FIG. 13, which serves as the ingress node, unlabeled frames are received by an unlabeled frame transmitter/receiver 1308, and the layer-2 headers, for example, Ethernet headers, of the unlabeled frames are then processed in a layer-2 header processor 1306. By referring to a stream information table 1301 based on the layer-3 information and/or upper-layer information of the packets assembled from the frames, a packet processor 1304 classifies the packets into specific streams, and obtains contents of the processing to be executed on each stream. The contents of the processing includes an output interface, the type and value of label (of the generic label header or the layer-2 header) to bet provided when the packets belonging to the stream are output as frames, CoS information, and the TTL value of the generic label header. In accordance with the contents obtained by the packet processor 1304, adequate headers are provided for the stream in a generic label header processor 1305 and in the layer-2 header processor 1306, and a resulting labeled frame is then transmitted from a labeled-frame transmitter/receiver 1307 of a specified output interface.

If the edge node 1300 is used as the egress node, a labeled frame received by the labeled-frame transmitter/receiver 1307 is unlabeled in the reverse order to that employed for labeling the packets in the ingress node, and the unlabeled frame is transmitted from the unlabeled frame transmitter/receiver 1308 of a specified output interface.

Packets transmitted and received by the edge node 1300 contain not only packets that are processed in the above-described way for label switching, but also control messages used for establishing and releasing LSPs. The control messages are analyzed in a control message processor 1303, and contents of the LSP-control processing to be executed is determined in an LSP-status manager 1302. The contents of the LSP-control processing includes control messages to be sent to neighboring nodes, and information required in this edge node for label switching (label value to be provided and TTL value to be decremented, etc.). After processing the control message in the above manner, at least a part of resulting information is stored in the stream information table 1301, which will be discussed later.

In a core node 1400 of FIG. 14, labeled frames are received by a labeled-frame transmitter/receiver 1406. If a label value for frame switching is contained in the layer-2 header (for example, if the datalink used in receiving the frames is ATM or frame relay), the content of the layer-2 header is referred to as a key to search a label information table 1403 by a layer-2 header processor 1405. Otherwise (for example, if the datalink used in receiving the frames is LAN or PPP), the content of a generic label header obtained after executing normal layer-2 processing is used as a key to search the label information table 1403 by a generic label header processor 1404. Subsequently, a switch 1407 performs frame switching in accordance with the result obtained by searching the label information table 1403, and the previous layer-2 header or generic label header is replaced by a new layer-2 header or generic label header in accordance with the result obtained by searching the label information table 1403. If the core node 1400 is an intermediate node that processes generic label headers, the result obtained by searching the label information table 1403 includes also the TTL value to be decremented, and the TTL value in the generic label header is overwritten. Finally, a switched frame is transmitted from the labeled-frame transmitter/receiver 1406 of a specified output interface.

Packets transmitted and received by the core node 1400, as in the case of the edge node 1300, also include control messages for establishing and releasing LSPs. The control messages are analyzed in a control message processor 1402, and contents of the LSP-control processing to be executed are determined in an LSP-status manager 1401. The contents of the LSP-control processing include control messages to be sent to neighboring nodes, and information required in this core node for label switching (label value to be provided and TTL value to be decremented, etc.). After processing the control message in the above manner, at least a part of resulting information is stored in the label information table 1403, which will be discussed later.

A method for appropriately decrementing the TTL value in various network environments is discussed below.

In a first example, only PPP links and/or LAN media are employed as the layer-2 media of an LSP. In this network environment, TTL processing executed when packet transfer is performed based on the generic label header shown in FIG. 1 is as follows.

Referring to FIGS. 2(*a*)–2(*c*), an ingress node 201 of the LSP first checks a stream information table 701 shown in FIG. 7 (corresponding to the stream information table 1301 shown in FIG. 13) by using, as a key, stream information (for example, destination layer-3 address, source layer-3 address, and so on) obtained by referring to the header of a received layer-3 packet, and determines the output interface and the content of a generic label header (label value, CoS value, and TTL value) to be provided. Then, the ingress node 201 attaches the generic label header and a layer-2 header to the frame and then outputs the layer-2 frame from the determined output interface.

In this case, the TTL value (label_ttl) of the generic label header to be attached to the frame to be output is obtained by decrementing the TTL value (ip_ttl) of the layer-3 header of the received packet by one.

Upon receiving the layer-2 frame, each of label switching routers 202–206 processes the layer-2 header and then checks a label information table 801 illustrated in FIG. 8 (corresponding to the label information table 1403 illustrated in FIG. 14) by using, as a key, the label field of the generic label header (and the CoS field if necessary). As a result, each of the label switching routers 202–206 determines the output interface and the label field value to be provided, and also decrements the TTL field value of the generic label header by one. Then, each of the label switching routers 202–206 overwrites the generic label header of the received frame by these new label value and TTL value, attaches a new layer-2 header to the frame, and then outputs this layer-2 frame from the determined output interface.

Ultimately, after receiving the layer-2 frame and processing the header of the layer-2 frame, an egress node 207 checks the label field of the generic label header, and identifies the type of upper-layer protocol and confirms that the egress node 207 is a terminating point of the LSP. The egress node 207 then removes the generic label header and outputs the resulting packet from a determined interface after performing layer-3 processing. In this case, the TTL value of the layer-3 header to be attached to the packet to be output from the LSP is obtained by decrementing the TTL value of the generic label header of the received frame by one.

According to the aforementioned procedure, the TTL value (n-7), which is the same as the value that is supposed to be obtained by a conventional hop-by-hop transfer technique, that is, by decrementing the TTL value of the layer-3 header in each router, can be provided for the layer-3 header when the packet is output from the LSP.

Figure 2A:
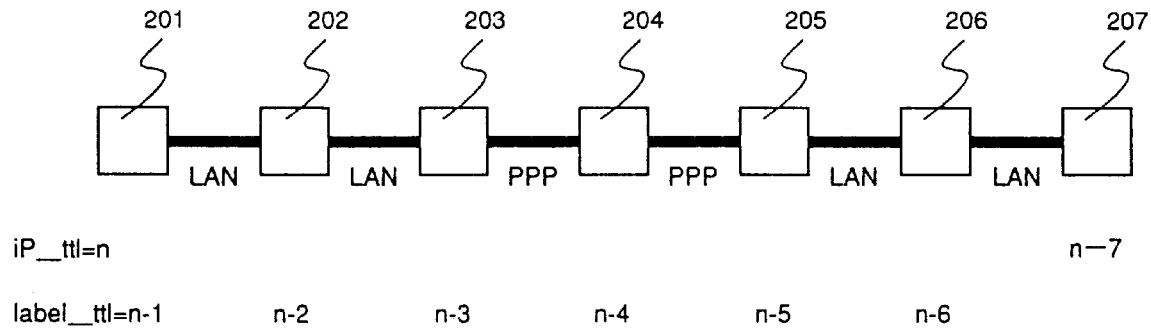
FIGS. 2(a), 2(b) and 2(c) illustrate an exemplary control procedure in a case where packet transfer on an LSP is performed based on the generic label header, and where intermediate nodes execute TTL processing.
Figure 2B:
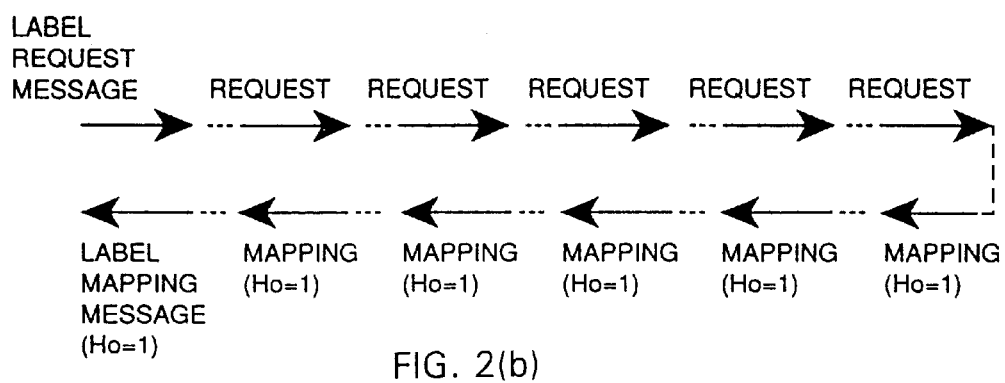
Figure 2C:
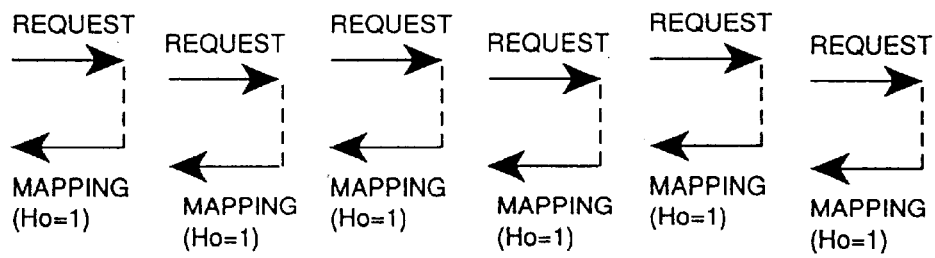

According to the LDP used in the aforementioned technique, it is not demanded that the respective nodes exchange information concerning the hop-count (indicated by Ho in FIGS. 2(b) and 2(c)) which is the number of hops from the ingress node 201 to the egress node 207. If the hop-count information is supposed to included in the control message such as a label mapping message, Ho=1 may be filled in such information. Accordingly, an LSP may be established by transferring a label request message from the ingress node 201 to the egress node 207 and by sending back a label mapping message sequentially from the egress node 207 to the ingress node 201 (FIG. 2(b)). Alternatively, the label assigning procedure may be performed independently between neighboring nodes (FIG. 2(c)).

If, on the other hand, the layer-2 header originally possesses a label field, which is implemented by ATM or frame relay, each node can perform label switching without the generic label header shown in FIG. 1. That is, packets are transferred through label switching merely by using a value of the VPI/VCI or DLCI field in an ATM cell header or frame relay header as the label.

In this case, even if the generic label header shown in FIG. 1 is added to the layer-3 packet, intermediate nodes of an LSP may not check or update the TTL value. Thus, calculations of the TTL value, which are conducted in the first example, are not performed in the intermediate nodes.

Accordingly, a second example is discussed below with reference to FIGS. 3(a)–(c) of packet transfer performed on an LSP in a case where none of the intermediate nodes executes TTL processing, because, for example, the layer 2 is based on ATM.

An ingress node 301 of the LSP first checks the stream information table 701 shown in FIG. 7 by using, as a key, stream information (for example, destination layer-3 address, source layer-3 address, and so on) obtained by referring to the header of a received layer-3 packet, and determines the output interface and the TTL value of a generic label header to be provided. The ingress node 301 also determines the VPI/VCI value and writes it into an ATM cell header. The resulting ATM cell is then output from the determined output interface. More specifically, a generic label header is added to a packet, which is then provided with an ATM adaptation layer (AAL) trailer. The resulting packet is then formed into segments having a fixed length, and the cell header is then provided.

Figure 3A:
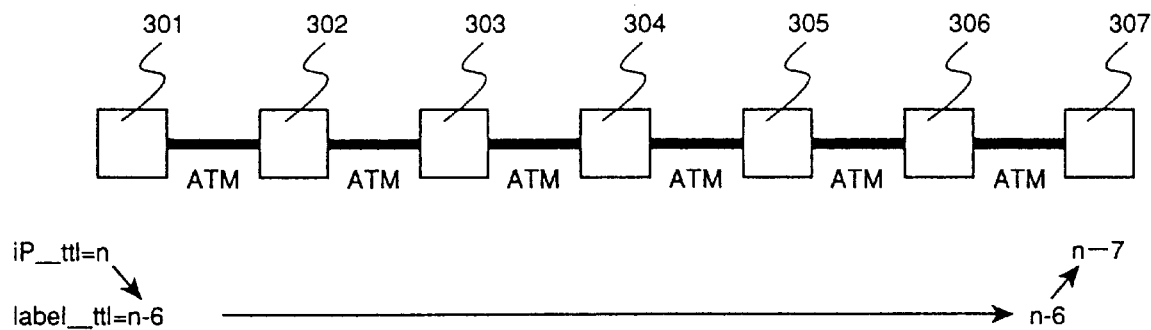
FIGS. 3(a), 3(b) and 3(c) illustrate an exemplary control procedure in a case where packet transfer on an LSP is performed based on a layer-2 header, and where intermediate nodes do not execute TTL processing.

In the ingress node 301, the TTL value of the generic label header to be provided for the packet to be output is obtained by decrementing the TTL value of the layer-3 header of the received packet by the number of hops in the LSP (by 6 hops in FIG. 3(a)).

By referring to the label information table 801 shown in FIG. 8 based on the VPI/VCI value of the received cell, each of downstream label switching routers 302[\N]306 determines the output interface and the VPI/VCI value to be provided for a cell to be output, and then writes the determined VPI/VCI value into the cell. The resulting cell is then output from the determined output interface. The above-described transfer procedure can be realized by processing only an ATM cell header (generally, the layer-2 header including frame relay). It is thus unnecessary to check or update the individual fields of the generic label header shown in FIG. 1 inserted between the layer-2 header and the layer-3 header.

Ultimately, by referring to the VPI/VCI value of the received cell header, an egress node 307 confirms that it is a terminating point of the LSP and then reconstructs the packet. The layer-3 header of the packet is then processed, and the resulting packet is output from a specified output interface.

Figure 3B:
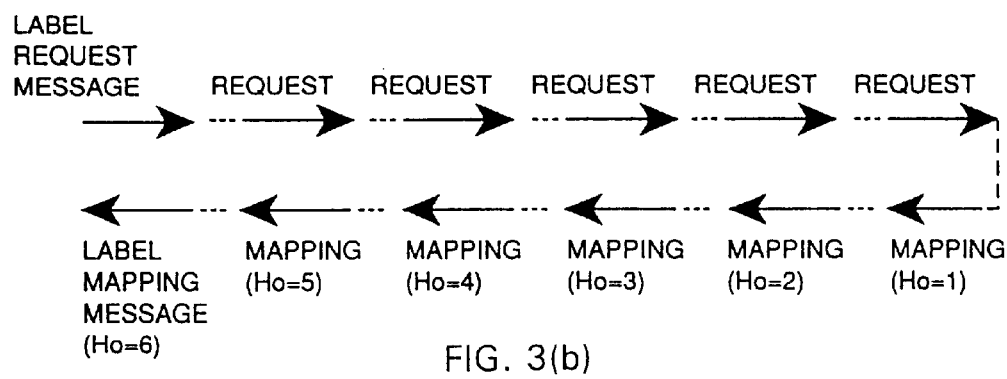
Figure 3C:
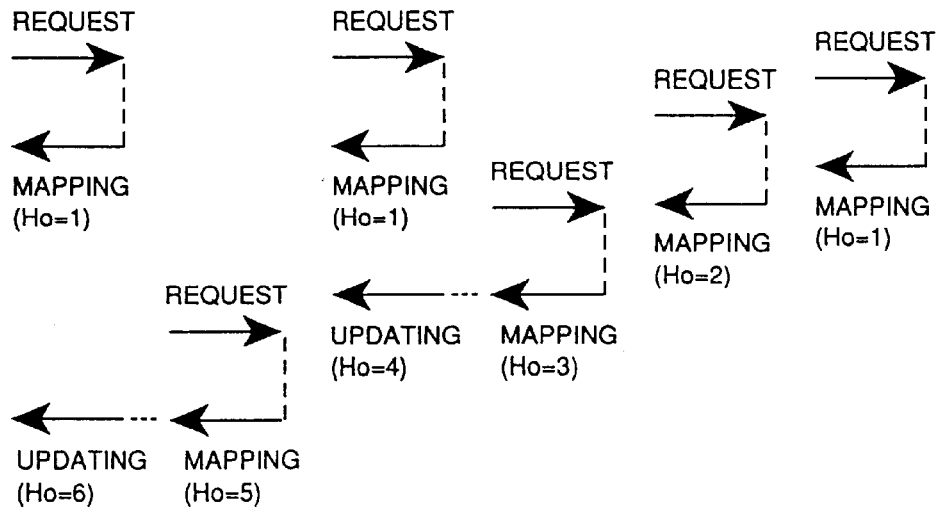

According to this transfer procedure, the ingress node 301 has stored the number of hops from the ingress node 301 to the egress node 307 and decrements the TTL field value of the generic label header (and/or the layer-3 header) by the number of hops (6 hops in FIGS. 3(a)–3(c)). With this arrangement, the TTL value of the layer-3 header when a packet is output from the egress node 307 can be set as the same value as the TTL value, which is supposed to be obtained by a conventional technique, i.e., by decrementing the TTL value of the layer-3 header in each router. That is, in the egress node 307, the TTL value provided for the layer-3 header of a packet to be output is obtained by decrementing the TTL value of the generic label header (or the layer-3 header) of the received packet by one, so that the TTL value equal to the TTL value calculated in conventional routers can be obtained.

According to the LDP employed in the aforementioned packet transfer procedure, each of the core nodes 302 through 306 manages the information concerning hop-count (indicated by Ho in FIGS. 3(b) and 3(c)) from that core node to the egress node 307 by using the LSP-status manager 1401 illustrated in FIG. 14, and also, the ingress node 301 is required to manage the information concerning the hop-count from the ingress node 301 to the egress node 307 by using the LSP-status manager 1302 shown in FIG. 13.

Thus, the LSP is established by transferring a label request message from the ingress node 301 to the egress node 307 and by sending back a label mapping message from the egress node 307 to the ingress node 301. The hop-count Ho is included in the label mapping message from the egress node 307, and each core node transfers the message to its upstream node while incrementing the hop-count Ho one-by-one (FIG. 3(b)). Alternatively, even without sending a label request message, the egress node 307 may voluntarily multicast a label mapping message to its upstream side, and only the upstream core node 306 relating to a stream indicated in the label mapping message may actually receive the label mapping message, increment Ho by one, and multicast the label mapping message. Thus, the label mapping message whose Ho is sequentially incremented up to 6 hops may be transferred to the ingress node 301 by the similar operation of the core nodes 305 through 302.

Yet alternatively, the label assigning procedure may be performed independently between neighboring nodes. In this case, a node that transmits a label mapping message to its upstream node writes into the label mapping message the current hop-count information Ho which represents the number of hops from the node to a currently-recognized egress node. Upon recognizing that the hop-number information Ho has been changed based on a notification from its downstream node, the node reports new hop-count information Ho to its upstream nodes by means of a control message (FIG. 3(c)). This control message for reporting the updated hop-count may be a separate message (updating message) dedicatedly used for updating the hop-count information, or may be the label mapping message which is re-transmitted and contains the updated hop-count information.

In the example shown in FIGS. 3(a)–3(c), the connection identifier (VPI/VCI or DLCI) of the ATM header or the frame relay header is used as a label value for performing label switching. However, even if a layer-2 network between neighboring label switching nodes is based on ATM or frame relay, the connection identifier of the ATM header or the frame relay header may not be used for label switching. More specifically, by utilizing an ATM connection or a frame relay connection merely as a physical link, each node of an LSP may perform label switching based on the label value of the generic label header shown in FIG. 1. In this case, the TTL processing procedure similar to that discussed with reference to FIGS. 2(a)–2(c) is performed in the individual nodes.

In another network environment, a single LSP may include two types of segments, that is, segments that perform label switching by utilizing the label value of the generic label header shown in FIG. 1, and segments that perform label switching by utilizing the label value of the layer-2 header based on ATM or frame relay. TTL processing executed in such a network environment is described below as a third example with reference to FIGS. 4(a)–4(d).

Transition of the TTL value of the layer-3 header and the generic label header, and the hop-count management procedure are shown in FIGS. 4(a)–4(d). In this example, as discussed above, a single LSP includes segments that perform label switching by using the ATM VPI/VCI value, segments that perform label switching by using the label value of the generic label header, as in PPP, and segments that perform label switching by frame relay DLCI.

An ingress node 401 of the LSP first checks the stream information table 701 shown in FIG. 7 by using, as a key, stream information (for example, destination layer-3 address, source layer-3 address, and so on) obtained by referring to the header of a received layer-3 packet, and determines the output interface (in this example, ATM interface) and the TTL value of a generic label header to be provided. The ingress node 401 also determines the output label value (in this example, the VPI/VCI value) and adds it to an ATM cell header. Thereafter, an ATM cell provided with the ATM cell header is output from the determined output interface.

The TTL value of the generic label header to be provided for a packet to be output from the ingress node 401 is acquired by decrementing the TTL value in the layer-3 header of the received layer-3 packet by the number of hops from the ingress node 401 to a node 403 that subsequently processes the TTL value of the generic label header (by the number of nodes performing label transfer by using the VPI/VCI as a label, i.e., two, in FIG. 4(a)). The number by which the TTL value is to be decremented can be obtained by checking the stream information table 701.

Upon receiving the ATM cell, a downstream label switching router 402 searches the label information table 801 shown in FIG. 8 by using, as a key, the input VPI/VCI value of the cell header, and determines the output interface and confirms that the type of output label assigned to the corresponding LSP is a VPI/VCI of the cell header. The label switching router 402 then writes the value of output label obtained from the label information table 801, which is a VPI/VCI value, into the cell header and outputs the cell from the determined output interface. In this case, since label switching is performed only by processing the cell header, the fields including the TTL value of the generic label header provided for the layer-3 packet are not checked or updated.

A further downstream label switching router 403 searches the label information table 801 by using, as a key, the input VPI/VCI value of the cell header of the received ATM cell, and determines the output interface (in this example, a PPP link interface), the output label value (in this example, the type of output label is a label in the generic label header) assigned to the corresponding LSP, and the TTL value to be filled in the generic label header. In a case where its downstream node 404 fills a label value in the label field of the generic label header (where the downstream node 404 executes processing of the generic label header by decrementing the TTL value), the TTL value is calculated in the node 403 by decrementing by one (one hop) the TTL value of the generic label header received from the ATM network. Whether the number by which the TTL value is to be decremented is one (default) or the number of hops (two or more) from the node 403 to a node that subsequently processes the TTL value of the generic label header is determined by referring to the label information table 801.

Upon receiving the PPP frame, a downstream label switching router 404 processes the PPP header and then searches the label information table 801 by using, as a key, the label field (and CoS field if necessary) of the received generic label header, thereby determining the output interface (in this example, PPP link interface), the type and value of output label, and the number by which the TTL value is to be decremented (in this example, one). The generic label header is then updated and provided with a PPP header, thereby outputting the resulting frame.

Further, a downstream label switching router 405 searches the label information table 801 by using, as a key, the input label value of the received generic label header, and determines the output interface (in this example, frame relay interface), the output label type (DLCI) and the output label value, and the number by which the TTL value is to be decremented (the number of hops from the node 405 to a node 407 that subsequently processes the TTL value of the generic label header).

In the router 405, the number of hops (2) in the frame relay network is determined. The generic label header is then updated, and also, the obtained DLCI value is provided for the frame relay header and the resulting frame is output. In this case, the label value of the generic label header provided in the output frame is not used for switching in a downstream router 406 (instead, the DLCI value of the layer-2 header is used for switching in the node 406). Thus, a value, which is meaningful for switching, may not be filled in the label field of the generic label header.

Then, the label switching router 406 searches the label information table 801 by using, as a key, the DLCI value of the frame header of the received relay frame, and then identifies that the output label, as well as the input label, represents a DLCI of the frame relay header. Processing of the TTL value of the generic label header is thus skipped, and only the DCLI value is updated. The resulting frame is then transferred to its downstream node 407.

The node 407, which serves as the egress node of the LSP, checks the DLCI value of the frame header of the received frame relay and confirms that the node 407 is a terminating point of the LSP. Thus, the node 407 removes the frame relay header, and also checks and deletes the generic label header. After processing the layer-3 header, the packet is output from a determined interface (or the node 407 may be a receiving host).

According to the aforementioned third example shown in FIGS. 4(a)–4(d), each of the ingress node 401 and the intermediate nodes 403, 404, and 405 that process the generic label header stores the number of hops from each node itself to a node that subsequently processes the generic label header. The TTL field value of the generic label header is decremented by this stored number of hops (two hops in the node 401, one hop in the nodes 403 and 404, and two hops in the node 405). Accordingly, the TTL value provided for the layer-3 header in the egress node 407 can be obtained by decrementing the TTL value of the received generic label header by one. It is thus possible to appropriately set the TTL value. With this arrangement, the TTL value of the layer-3 header to be provided when a packet is output from the egress node 407 of the LSP can be set to the same value as would be obtained by a conventional hop-by-hop transfer technique, i.e., by decrementing the TTL value of the layer-3 header in each node.

According to the LDP employed to realize the aforementioned transfer procedure, the individual nodes (including the ingress node 401) processing the generic label header collect and store the hop-count information concerning the aforementioned number of hops (represented by Ho in FIGS. 4(*b*)–4(*d*)).

For example, the LSP may be established by transferring a label request message from the ingress node 401 to the egress node 407, and by sending back a label mapping message from the egress node 407 to the ingress node 401, as illustrated in FIG. 4(*b*). In this case, the hop-count information (Ho=1) is first included in the label mapping message sent from the egress node 407. Upon receiving the label mapping message, an intermediate node compares the type of output label with the type of input label of the LSP to be established and determines whether the intermediate node is to process the generic label header (whether the intermediate node is to update the TTL value of the generic label header). If the outcome of the determination is yes, the intermediate node sends the label mapping message indicating that the hop-count information is one (Ho=1) to its upstream node. Otherwise, the intermediate node fills in the label mapping message a new hop-count information (Ho>=2) obtained by incrementing the hop-count information received from the downstream node by one, and transmits the label mapping message to its upstream node.

In the LSP shown in FIG. 4(*a*), the generic label header is processed in the node 403 at which the type of label is changed from ATM (VPI/VCI) to PPP (generic label) and in the node 405 at which the type of label is changed from PPP (generic label) to frame relay (DLCI). Also, the node 404 located at a boundary of the PPP links processes the generic label header though the type of label is not changed there.

Accordingly, the label mapping message is transferred from the downstream node to the upstream node, as illustrated in FIG. 4(*b*), while changing the Ho value contained in the label mapping message. Alternatively, without sending a label request message, the egress node 407 may voluntarily multicast a label mapping message to its upstream side. Then, only the intermediate node relating to a stream contained in the label mapping message may actually receive the message and transfer it to its upstream side while, if required in accordance with the above-described determination, incrementing the Ho value in the message.

In an alternative approach to sending messages, as shown in FIG. 4(*c*), the sequence of first transferring the label request message sequentially from an upstream node to a downstream node and then sending back the label mapping message accompanied by appropriate hop-count information Ho sequentially from the downstream node to the upstream nodes is executed within one zone of the LSP in which the generic label header is not processed. That is, the label request message is transferred in the order of the nodes 401, 402, and 403, and the label mapping message is sent back in the order of the nodes 403, 402 (Ho=1), and 401 (Ho=2).

In this case, label assigning by the label mapping message including Ho=1 or not including any Ho is performed independently within each of the zones between the nodes 403 and 404 and between the nodes 404 and 405. The label request message and the label mapping message are transferred in the nodes 405, 406, and 407, as in the case of the nodes 401, 402, and 403.

Upon receiving the label request message or the label mapping message as discussed above, an intermediate node determines whether the message is to be passed to the downstream node or to the upstream node (by writing the Ho value into the label mapping message) like the nodes 402 and 406, or the label request message is to be terminated at the node and the label mapping message is to be returned to the upstream node like the nodes 403 through 405. Such a determination may be performed by comparing the type of output label with the type of input label of the LSP to be established. If it is found that the node performs generic label processing (updating the TTL value of the generic label header), the node determines to terminate the message. If it is found that the node does not perform generic label processing, the node determines to pass the message to the downstream or upstream node.

If the node executes generic label processing (i.e., if the node is 403, 404, 405, or 407), the node may also determine whether the label mapping message without Ho can be sent (as in the case of the node 404 or 405) or the label mapping message with hop-count information (Ho=1) is to be sent (as in the case of node 403 or 407) based on the type of input label. If necessary, message exchange may be carried out between neighboring nodes for the node to check whether its upstream node executes generic label processing. Alternatively, all of the nodes 403, 404, 405, and 407 may transmit a label mapping message without Ho, and if the upstream node receiving this message is the node 402 or 406, the upstream node may interpret that Ho=1 and transfer the message including the incremented Ho to its upstream node 401 or 405.

As in the modification shown in FIG. 3(*c*), the label assigning procedure may be executed independently between neighboring nodes, as illustrated in FIG. 4(*d*). A node that is to transmit a label mapping message to the upstream node writes into the message current hop-count information Ho that represents the number of hops from the node to a currently-recognized node on the nearest downstream side as executing generic label processing. Upon recognizing that the hop-count information Ho (which is notified by the downstream node) has been changed, the node is required to report new hop-count information to its upstream node by way of a control message. This control message may be a separate message dedicatedly used for updating the hop-count information, or may be the label mapping message resent with the updated hop-count information.

The fourth and fifth examples of TTL processing executed in another network environment, where a single LSP contains segments that perform label switching by utilizing the label value of the generic label header shown in FIG. 1 and segments that conduct label switching by utilizing the label value of the layer-2 header, is described below as with reference to FIGS. 5(*a*)–5(*d*) and 6(*a*)–6(*d*). In the third example illustrated in FIG. 4, label switching segments are arranged in the order of ATM, generic label, and frame relay. In FIGS. 5(*a*)–5(*d*) and 6(*a*)–6(*d*), however, label switching segments are arranged in the order of generic label, frame relay, and ATM. In this network environment, two different techniques of TTL processing of the generic label header, which are respectively illustrated in FIGS. 5(*a*)–5(*d*) and FIGS. 6(*a*)–6(*d*), may be considered.

As the fourth example shown in FIGS. 5(*a*)–5(*d*), packet transfer is performed in an LSP in a manner similar to the third example shown in FIGS. 4(*a*)–4(*d*).

An ingress node 501 of the LSP first checks the stream information table 701 shown in FIG. 7 by using, as a key, stream information (for example, destination layer-3 address, source layer-3 address, etc.) acquired by referring to the header of the received layer-3 packet, and determines the output interface (in this example, a LAN interface) and the content of the generic label header (label value, CoS value, and TTL value) to be attached. The ingress node 501 then attaches the generic label header and the layer-2 header to the frame and outputs the resulting layer-2 frame from the determined output interface. In this case, the TTL value (label_ttl) of the generic label header to be provided in the ingress node 501 is calculated by decrementing the TTL value (ip_ttl) of the received layer-3 header by one, since a downstream node 502 is also able to process the generic label header.

The node 502, upon receiving the frame, searches the label information table 801 by using, as a key, the label value of the generic label header, and performs label switching (decrementing the TTL value of the generic label header by one) by providing the generic label header to the frame to be output. A downstream node 503 that has received the frame then searches the label information table 801 by using, as a key, the label value of the generic label header. Based on the search result, the node 503 performs label switching and attaches the frame relay header as a label to the frame to be output. In the node 503, the TTL value to be decremented, described in the label information table 801, is two (therefore, the node 503 decrements the TTL value of the generic label header by two). This is because the node that subsequently processes the generic label header is two hops away (node 505). A node 504 searches the label information table 801 by using the frame relay header (DLCI) as an input label, and also provides the frame relay header (DLCI) including an output label to the frame to be output (the generic label header is not processed).

The node 505 searches the label information table 801 by using the frame relay header (DLCI) as the input label so as to obtain the output interface (ATM) and the output label (VPI/VCI). Although the label field value of the generic label header is not used for label switching, the TTL value (label_ttl) of the generic label header provided for the layer-3 packet is checked and updated when the frame relay frame is converted into an ATM cell. The label_ttl is decremented by two, which is the number of hops in the zone where label switching is performed by using the VPI/VCI label on downstream side of the node 505.

By referring to the VPI/VCI value of the received cell header, the node 507 confirms that it is a terminating point of the LSP. The node 507 then assembles the AAL frame, and checks and removes the generic label header. After executing the layer-3 processing, the resulting packet is output from a determined interface (or the node 507 may be a receiving host).

According to the fourth example discussed above, the TTL value of the generic label header is decremented by an adequate number of hops in (a) the node 503 that performs label switching by searching the label inform nation table 801 using the label value of the generic label header as a key, (b) the node 502 that updates the label value of the generic label header based on the search result of the label information table 801, and (c) the node 505 that is not required to check or update the label value of the generic label header but handles different types of headers (for example, frame relay header and ATM cell header) between the input label and the output label. As a result, the TTL value of the layer-3 header to be provided when a resulting packet is output from the egress node 507 of the LSP can be set to the same value as the TTL value would be obtained by decrementing the TTL value one-by-one in each router.

To implement the above method, either one of various LDPs similar to those of the third example shown in FIGS. 4(*b*) through 4(*d*) can be employed. That is, the LDPs include a technique of sequentially transferring a label request message from the ingress node 501 to the egress node 507 of the LSP and sending back a label mapping message from the egress node 507 to the ingress node 501, as illustrated in FIG. 5(*b*), a technique of transferring a label request message and sending back a label mapping message between both ends of each zone formed by nodes that do not perform ITL processing of the generic label header, as shown in FIG. 5(*c*), and a technique of updating hop-count information as required by conducting label assigning independently between neighboring nodes, as illustrated in FIG. 5(*d*). According to the LDPs indicated in this fourth example, a node (for example, the node 505) executes TTL processing even if it uses a DLCI of a frame relay header as the input label and uses a VPI/VCI of an ATM cell header as the output label, that is, the TTL value of the generic label header is decremented even if neither of the input label nor the output label is described in the generic label header.

In the fifth example illustrated in FIGS. 6(*a*)–6(*d*), in contrast to the fourth example shown in FIGS. 5(*a*)–5(*d*), TTL processing of the generic label header is not executed at the node 505 at which the label for label switching is changed from the frame relay header to the ATM cell header.

Label transfer in the fifth example is performed from the ingress node 501 up to the intermediate node 504 similarly to those shown in FIG. 5(*a*).

The node 505 searches the label information table 801 by using the frame relay header (DLCI) as the input label so as to obtain the output interface (ATM) and the output label (VPI/VCI). Since the label field value of the generic label header is not used for switching, the TTL value (label_ttl) of the generic label header provided for the layer-3 packet is not updated, though the frame relay frame is converted into the ATM cell. Accordingly, the nodes 504, 505, and 506 do not execute TTL processing of the generic label header, and thus the intermediate node 503 decrements the TTL value by the number of hops, i.e., four, from the node 503 to the node 507 that subsequently performs TTL processing.

Processing executed by the node 507, which serves as the egress node, is similar to that of the fourth example.

In the fifth example, the TTL value of the generic label header is decremented by an adequate number of hops in (a) the node 503 that performs switching by searching the label information table 801 using the label value of the generic label header as a key, and (b) the node 502 that updates the label value of the generic label header based on the search result of the label information table 801. As a consequence, the TTL value of the layer-3 header to be provided when a packet is output from the egress node 507 of the LSP can be set to the same value as would be acquired by decrementing the TTL value of the layer-3 header one-by-on in each intermediate router.

To implement the above method, either one of various LDPs similar to those of the fourth example shown in FIGS. 5(*b*) through 5(*d*) may be employed. That is, the LDPs include a technique of sequentially transferring a label request message from the ingress node 501 to the egress node 507 of the LSP and sending back a label mapping message from the egress node 507 to the ingress node 501, as illustrated in FIG. 6(*b*), a technique of transferring a label request message and sending back a label mapping message between both ends of each zone formed by nodes that do not perform TTL processing of the generic label header, as shown in FIG. 6(*c*), and a technique of updating hop-count information as required by conducting label assigning independently between neighboring nodes, as illustrated in FIG. 6(*d*). The LDP executed in the fifth example shown in FIGS.

Figure 5A:
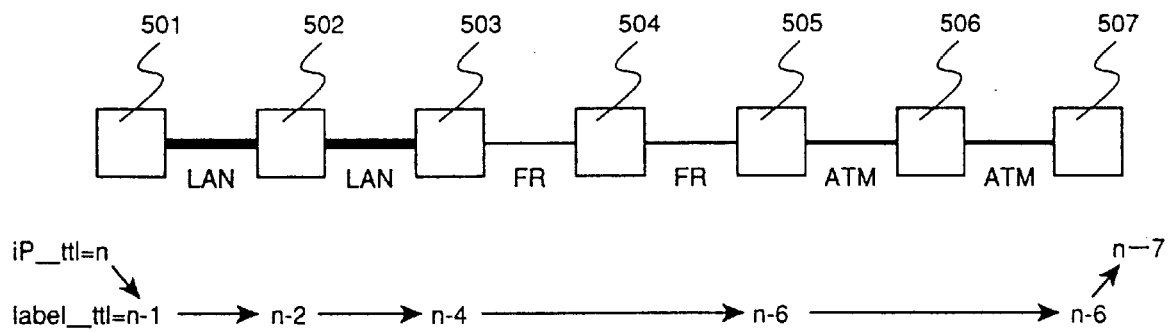
FIGS. 5(a), 5(b), 5(c) and 5(d) illustrate another example of a control procedure including TTL processing employed in a case where an LSP includes segments that perform switching by using a label value of the generic label header and segments that perform switching by using a label value of the layer-2 header.
Figure 5B:
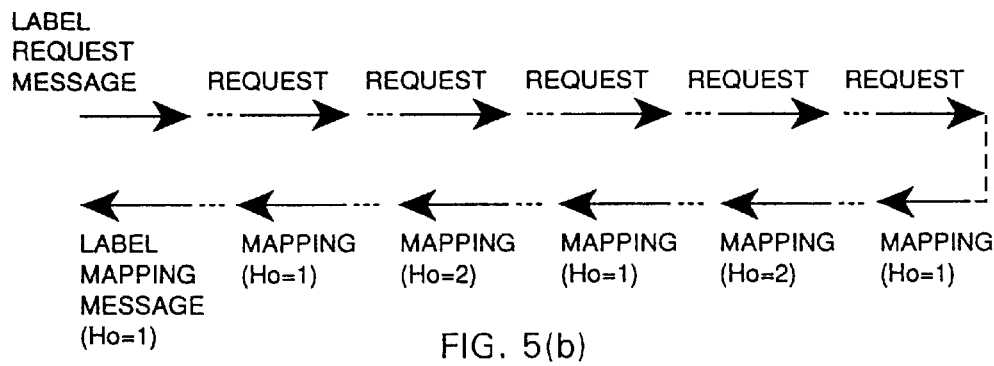
Figure 5C:
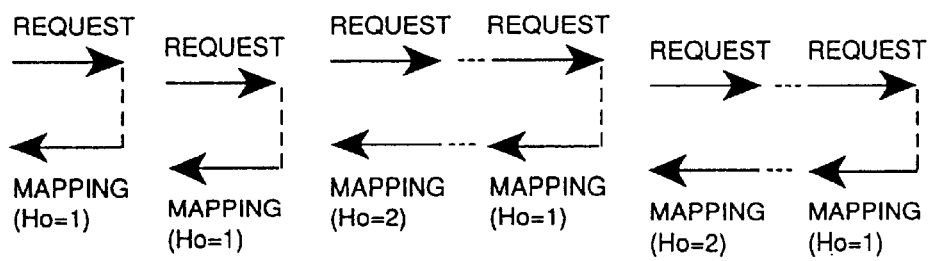
Figure 5D:
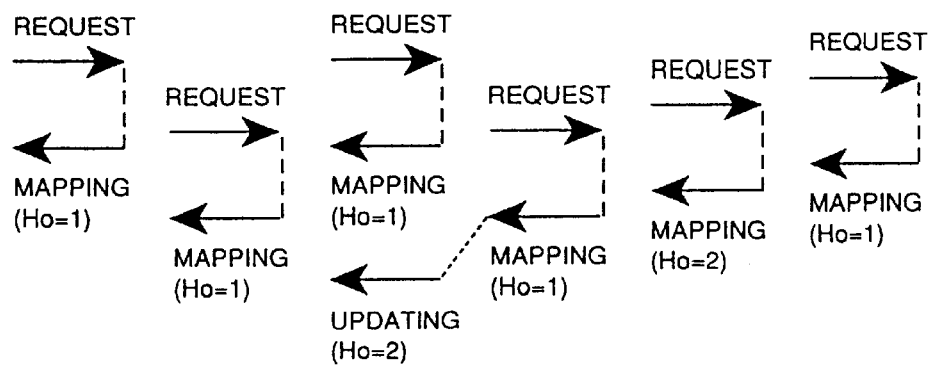

6(b) through 6(d) is different from that shown in FIGS. 5(b) through 5(d) in that the node 505, which uses the DLCI of the frame relay header as the input label and the VPI/VCI of the ATM cell header as the output label, determines that the node 505 is not to perform TTL processing.

That is, it is determined that the node 505 does not process the generic label header (does not update the TTL value) if neither of the input label nor the output label represents the generic label (instead, the label is ATM VPI/VCI or frame relay DLCI), regardless of whether the type of input label and the type of output label concerning a certain LSP are the same or different. Then, the node 505 fills in the label mapping message a new Ho value obtained by incrementing the Ho value received from the downstream node by one, and then transmits the message to the upstream node.

Figure 6A:
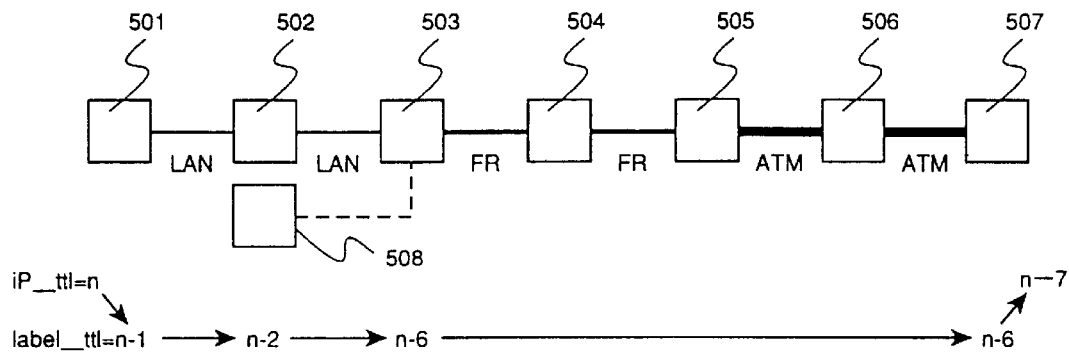
FIGS. 6(a), 6(b), 6(c) and 6(d) illustrate yet another example of a control procedure including TTL processing employed in a case where an LSP includes segments that perform switching by using a label value of the generic label header and segments that perform switching by using a label value of the layer-2 header.
Figure 6B:
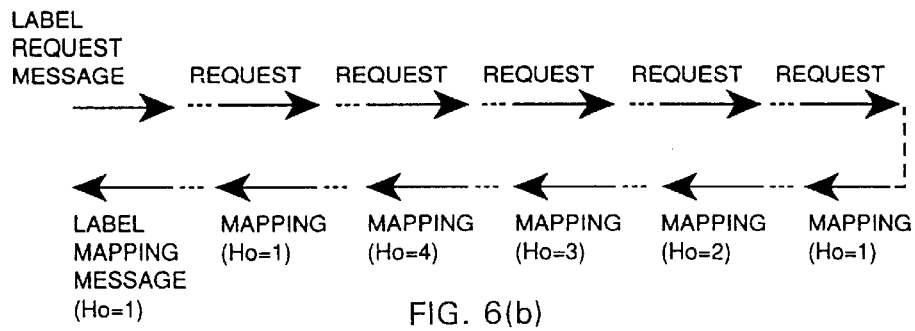
Figure 6C:
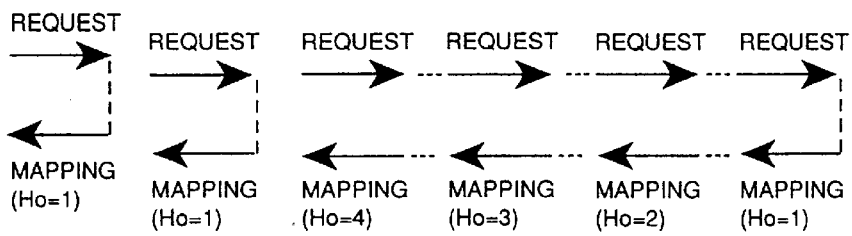
Figure 6D:
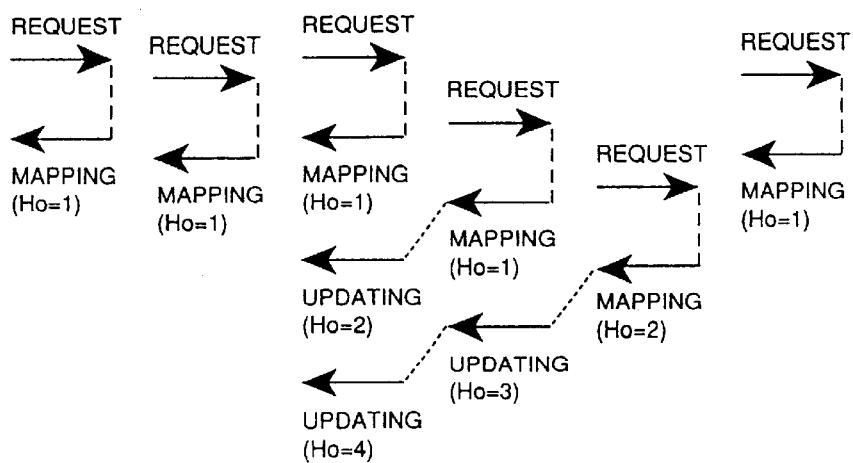

In the LDP shown in FIG. 5(d) or 6(d), even if the nodes of the LSP have already informed the hop-count to their upstream nodes when assigning the labels by the label mapping message, they may be required later to report an updated hop-count to the upstream nodes by way of a control message, in accordance with a new hop-count informed by the downstream nodes when labels are assigned later. The updated hop-counts in the nodes 505 and 504 shown in FIG. 5(d) are Ho=1 and 2, respectively, while the updated hop-counts in the nodes 505 and 504 shown in FIG. 6(d) are Ho=3 and 4, respectively. The control message may be a separate message dedicatedly used for updating the hop-count, or may be the label mapping message with updated hop-count information, as in the case of FIG. 4(d) or 3(c).

To summarize the respective cases discussed above, the operation performed by each node of an LSP upon executing the label distributing procedure will be described below.

Figure 9:
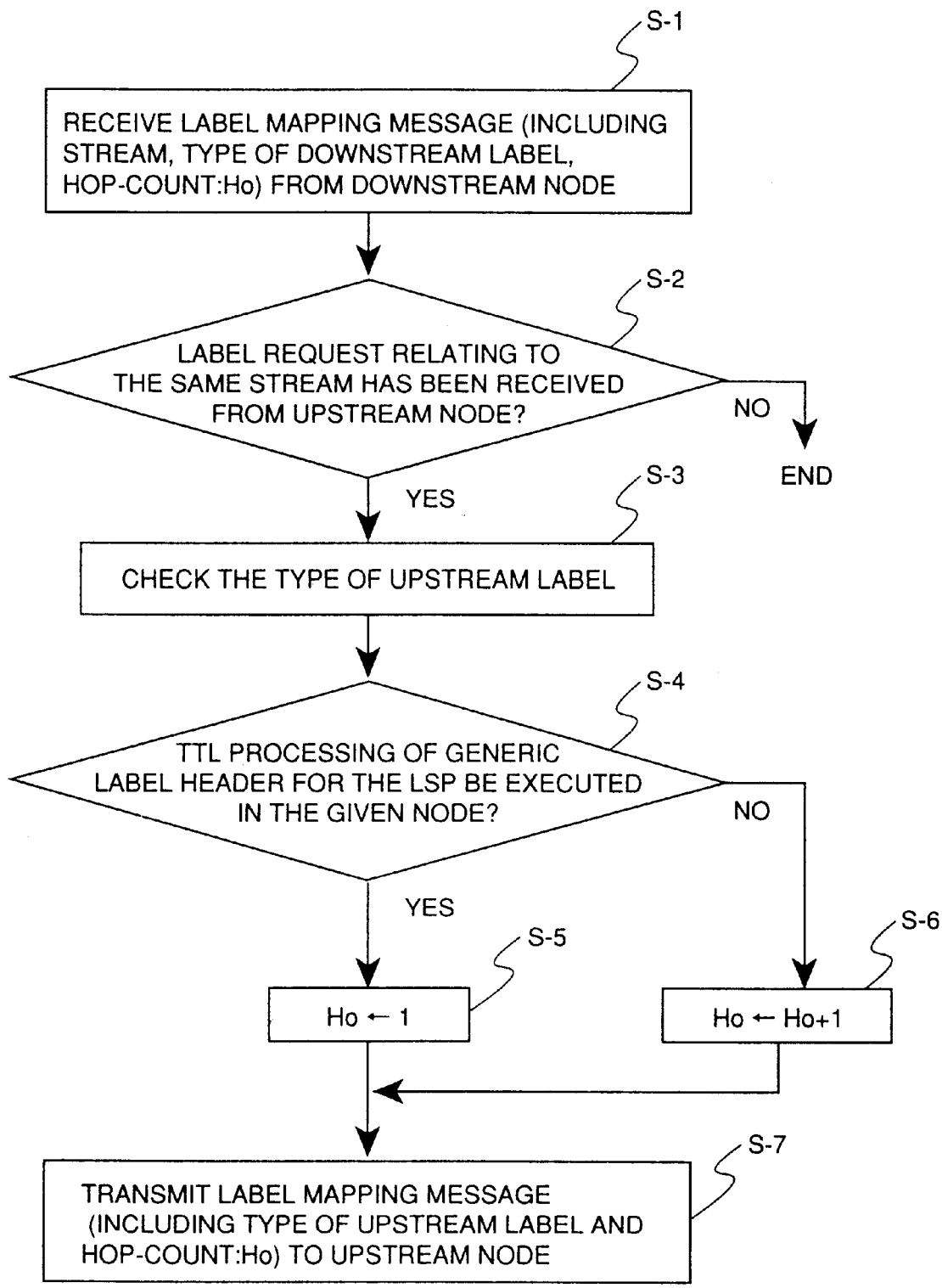
FIG. 9 is a flowchart illustrating an exemplary operation performed upon receiving a label mapping message from a downstream node.

FIG. 9 is a flowchart illustrating an example of the operation performed by each node upon receiving a label mapping message from the downstream node when the LDP illustrated in FIG. 4(b), 4(c), 5(b), 5(c), 6(b), or 6(c) is executed.

Upon receiving a label mapping message concerning a certain stream from the downstream node, information indicating the stream for which a label is requested to be assigned, the type of downstream label (ATM label, frame relay label, or generic label), and hop-count information Ho are checked and stored (step S-1).

It is then determined whether a label request message relating to the same stream as that indicated in the received label mapping message has been received from the upstream node (step S-2). If the outcome of step S-2 is no, the processing is completed, and the hop-count information Ho received from the downstream node is stored while relating it to the stream. In this case, if the node receives a packet belonging to the stream later, it operates as the ingress node of the LSP. That is, the value obtained by decrementing the TTL value (ip_ttl) of the layer-3 header of the received packet by the hop-count Ho is set as the TTL value (label_ttl) of the generic label header. The packet is then provided with a determined label value and is transmitted onto the LSP.

If the stream corresponding to the stream assigned with the label by the downstream node is waiting for label assigning on the upstream path (i.e., the result of step S-2 is yes), the label value to be assigned is determined, and the type of upstream label is checked (step S-3). Upon checking the types of upstream label and downstream label, it is determined whether the node is to perform TTL processing of the generic label header for the LSP to be established (step S-4). The basis for this determination will be discussed in detail below by way of specific examples.

If the result of step S-4 is yes, the hop-count information Ho is set to be one (step S-5), and the label mapping message is sent to the upstream node that is waiting for label assigning (step S-7). If it is found in step S-4 that TTL processing of the generic label header is not to be performed in this node, the hop-count information Ho is calculated by incrementing the Ho value received from the downstream node by one (step S-6), and the label mapping message is transferred to the upstream node that is waiting for label assigning (step S-7). With step S-7, the information corresponding to the content of the label mapping message processed in this node is generated as an entry of the label information table 801 shown in FIG. 8. Thereafter, upon receiving a frame provided with the label value reported to the, upstream node, the node determines the output interface and the output label value to be provided for the frame to be transferred, while serving as an intermediate node. The frame with the output label is then transmitted on the LSP.

Figure 10:
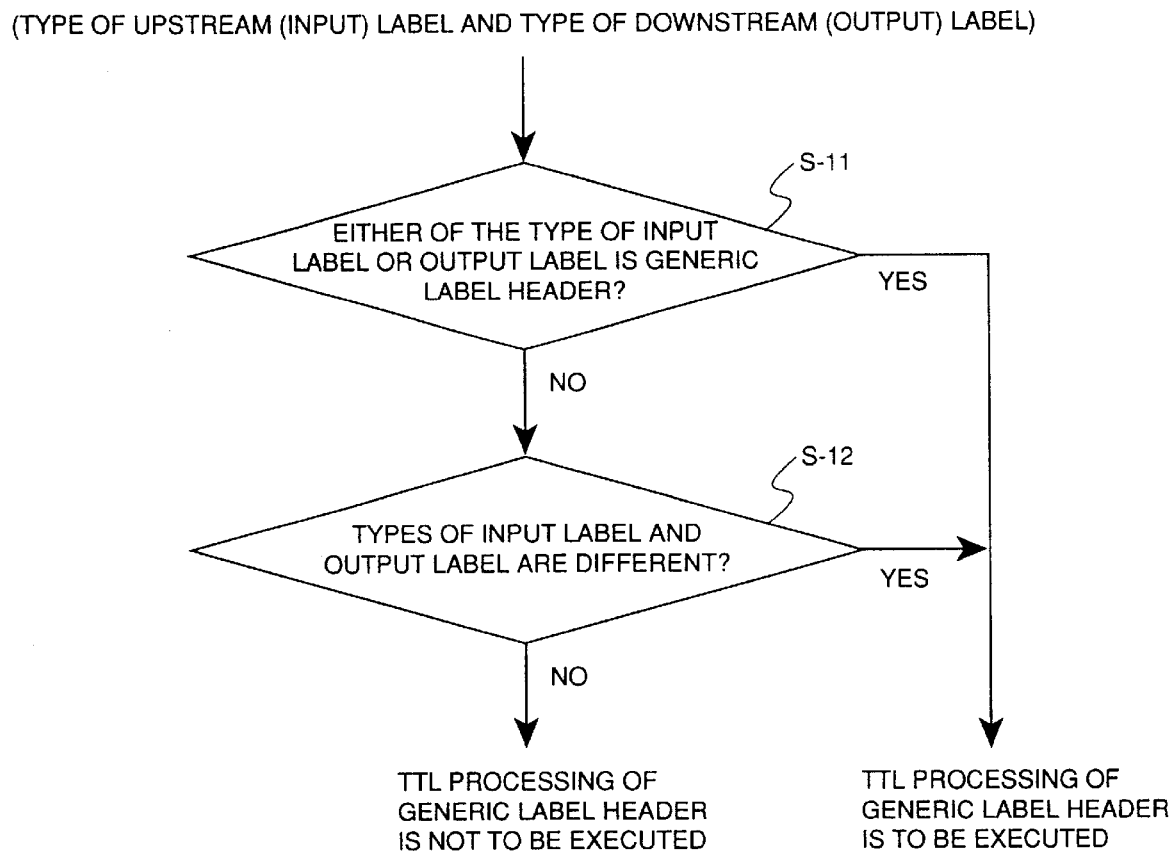
FIG. 10 is a flowchart illustrating an exemplary operation of a determination as to whether the node that has received the label mapping message is going to execute TTL processing on the generic label header.

FIG. 10 is a flowchart specifically illustrating an example of the determination (step S-4 of FIG. 9) of whether TTL processing of the generic label header is executed in the given node which has received the label mapping message from the downstream node. As parameters for making that determination, the type of input label and the type of output label are utilized. The label types and thee range of label values may have been negotiated between neighboring nodes which: are adjacent to each other physically or logically, and may be stored in the individual nodes.

In this example, it is first checked whether either of the type of input (upstream) label or output (downstream) label is the generic label header (step S-11). If the outcome of step S-11 is yes, it is determined that TTL value processing of the generic label header is to be executed in this node, because the node processes the generic label header for label switching. If neither of the type of input label nor output label is the generic label header (for example, it is a layer-2 header), it is further determined whether the types of labels are different (for example, ATM VPI/VCI or frame relay DLCI) (step S-12). If the result of step S-12 is no, it is determined that the TTL value of the generic label header is not to be processed (since the mere ATM switching or frame relay switching is performed) in this node.

If it is found in step S-12 that the types of labels are different (for example, the downstream label is ATM VPI/VCI and the upstream label is frame relay DLCI), it is determined that TTL processing of the generic label header is to be executed if the control technique shown in FIGS. 5(a)–5(d) is employed. On the other hand, it is determined that TTL processing of the generic label header is not to be executed if the control technique shown in FIGS. 6(a)–6(d) is used. Either case is possible according to an actual implementation of label switches, though FIG. 10 illustrates the determination in the case of control technique illustrated in FIGS. 5(a)–5(d).

Figure 4A:
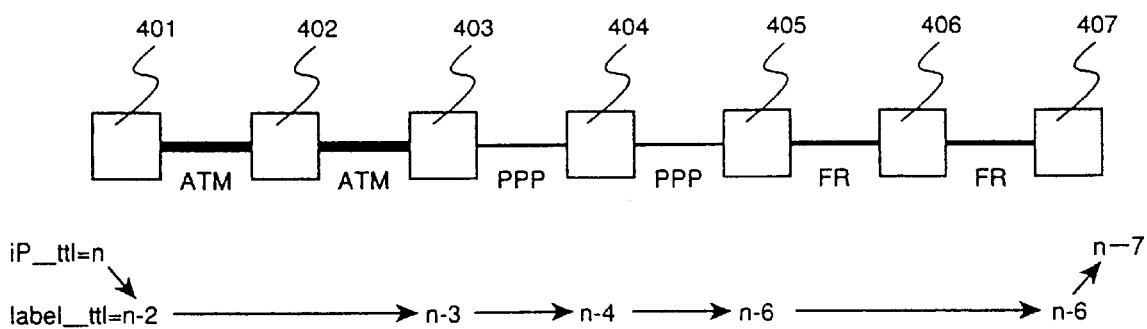
FIGS. 4(a), 4(b, 4(c) and 4(d) illustrate an example of a control procedure including TTL processing employed in a case where an LSP includes segments that perform switching by using a label value of the generic label header and segments that perform switching by using a label value of the layer-2 header.
Figure 4B:
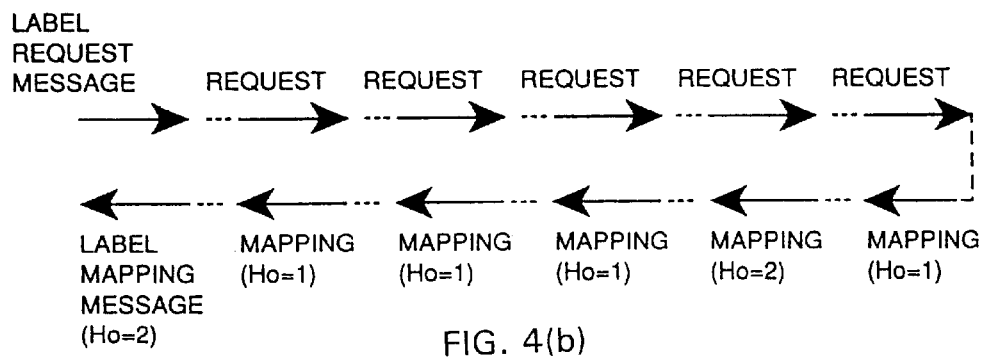
Figure 4C:
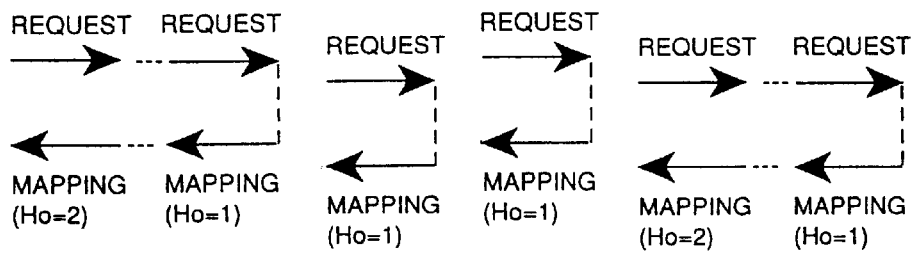
Figure 4D:
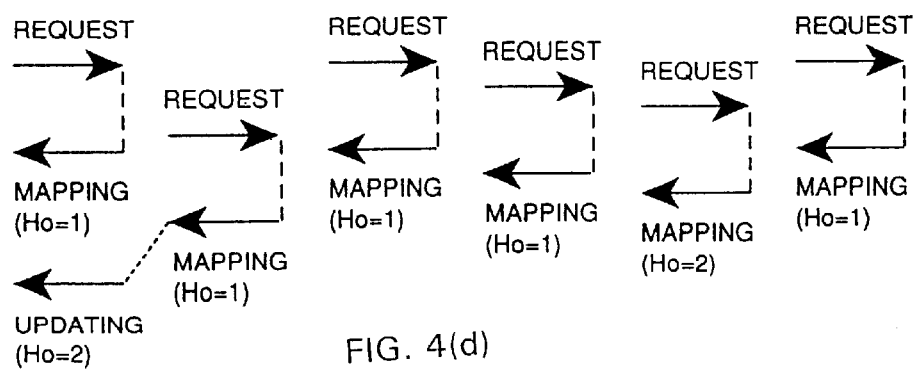
Figure 11:
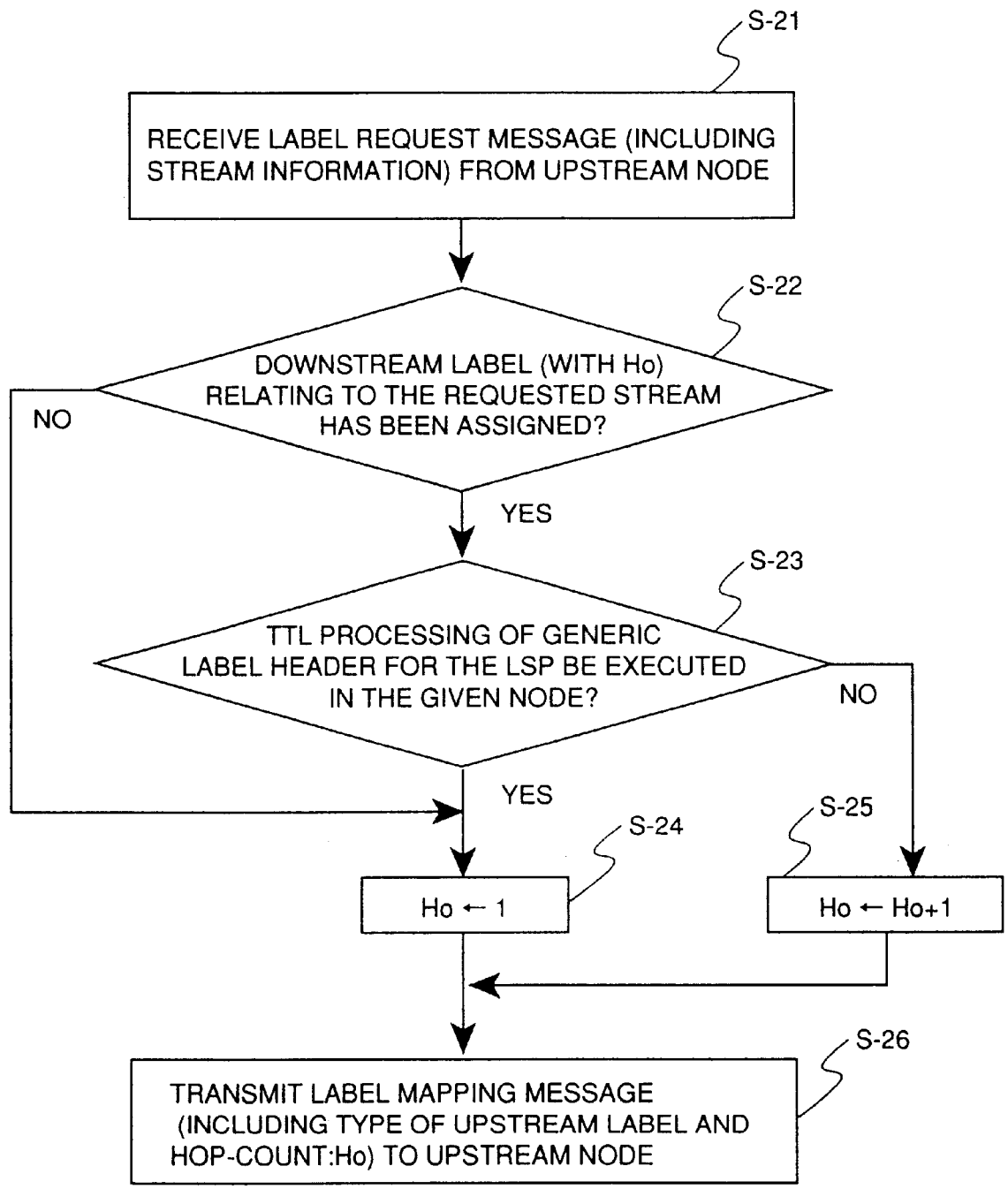
FIG. 11 is a flowchart illustrating an exemplary operation performed upon receiving a label request message from an upstream node.

FIG. 11 is a flowchart illustrating an example of the operation performed by each node upon receiving a label request message from the upstream node when the LDP illustrated in FIG. 4(d), 5(d), or 6(d) is employed. The operation represented by this FIG. 11 is performed in the case where the label assigning procedure is conducted independently between neighboring nodes, while FIG. 9 is for the case where the label request message is sequentially transferred from one node to another node and the label mapping message is sequentially sent back from that another node to that one node. According to the operation shown in FIG. 11, as in the case of the operation shown in FIG. 9, each node requires a mechanism for managing appropriate hop-count information (information concerning the number of nodes consecutively located that do not perform TTL processing).

Upon receiving a label request message concerning a certain stream from the upstream node (step S-21), the label value to be assigned is determined, and also, it is checked whether the downstream label relating to the requested stream has been assigned (step S-22).

If the absence of the downstream label is recognized (or if this node is topologically the egress router), the hop-count information (Ho=1) concerning the stream is stored (step S-24). The hop-count information Ho, together with the label value (and label type), is then informed to the upstream node by using the label mapping message (step S-26).

Conversely, if the presence of the downstream label is recognized in step S-22, it is determined, based on the type of existing downstream label and from the type of upstream label to be assigned, whether this node is to process the TTL value of the generic label header (step S-23). This determination may be made according to the procedure, for example, shown in FIG. 10. If the outcome of step S-23 is yes, the hop-count value (Ho=1) relating to the stream is stored (step S-24). If the result of step S-23 is no, the hop-count value Ho obtained by incrementing the value Ho received from the downstream node by one is stored (step S-25). Then, the stored hop-count information Ho, together with the label value (and the label type), is reported to the upstream node by using the label mapping message (step S-26).

Figure 12:
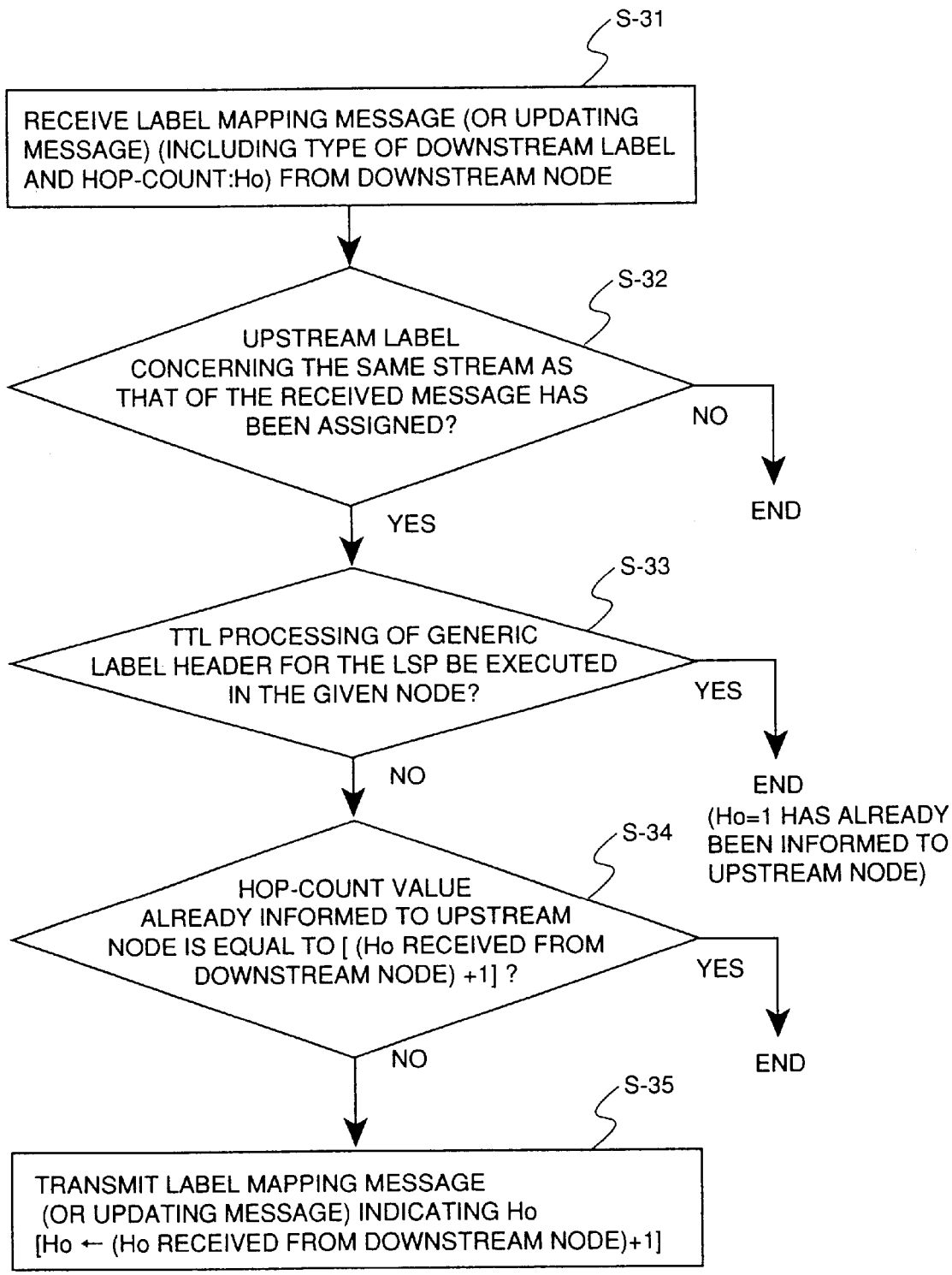
FIG. 12 is a flowchart illustrating another exemplary operation performed upon receiving a label mapping message (or updating message) from a downstream node.

FIG. 12 is a flowchart illustrating an example of the operation performed by each node upon receiving a label mapping message (or label-updating message, which will be discussed below) from the downstream node when the LDP illustrated in FIG. 4(d), 5(d), or 6(d) is executed as the control procedure.

Upon receiving a label mapping message from the downstream node, the hop-count information Ho included in the message is stored together with the downstream label (step S-31). It is then checked for the presence of the upstream label concerning the same stream as that contained in the received label mapping message (step S-32).

If the outcome of step S-32 is no, the processing is completed. If the result of step S-32 is yes, it is determined, based on the type of upstream label and the type of downstream label, whether this node is to process the TTL value of the generic label header (step S-33). This determination may be made according to, for example, the procedure shown in FIG. 10.

If the outcome of step S-33 is yes, the processing is completed, since the hop-count information (Ho=1) has been already informed to the upstream node. If the result of step S-33 is no, it is determined whether or not the hop-count value (Ho+1), which is a new hop-count obtained by incrementing the Ho value received from the downstream node by one, is equal to that stored as already notified to the upstream node (step S-34). If the outcome of step S-34 is yes, the processing is completed. If the result of step S-34 is no, the new hop-count (Ho+1) is reported to the upstream node as updated hop-count information Ho (step S-35). To report this updated hop-count information, an updating message, which is newly defined for informing a correct hop-count value, may be sent, or a label mapping message having the updated hop-count value may be sent.

In the examples stated above, only a point-to-point LSP has been discussed. However, the above-described examples are applicable to a multipoint-to-point (stream merge) LSP in which a plurality of different upstream labels are related to a single downstream label.

As an example, the following case may be considered. In the example shown in FIGS. 6(a)–6(d), in the point-to-point LSP established for a certain stream in which the ingress node 501 through the egress node 507 are sequentially arranged, a label request message for establishing an LSP for the same stream is sent from an upstream node 508, which is different from the current upstream node 502, to the intermediate node 503.

The processing executed by the node 503 in response to this request can be realized by applying any of the techniques shown in FIGS. 6(b) through 6(d) as follows.

The node 503 that has received the label request message from the upstream node 508 operates in a way similar to FIG. 11. That is, the node 503 checks whether the downstream label concerning the requested stream has been already assigned between the nodes 503 and 504. If the result is yes, it is determined, based on the type of label (frame relay DLCI) already assigned between the node 503 and the downstream node 504 and the type of label to be assigned between the node 503 and the upstream node 508, whether the node 503 is to process the TTL value of the generic label header for a packet stream requested by the node 508. This determination may be made according to the procedure shown in FIG. 10.

For example, if the type of new upstream label of the node 508 is a generic label of a LAN, as well as the upstream label already assigned with the upstream node 502, the node 503 processes the generic label. Accordingly, the hop-count information Ho=1 is stored, and the label value, together with the hop-count Ho=1 or without any hop-count information, is reported to the upstream node 508 by using a label mapping message.

When a packet belonging to the stream is actually transferred from the node 508, the node 503 refers to the label value of the received generic label header so as to determine the output interface and the frame relay DLCI value for the frame to be transferred to the downstream node 504, by searching the label information table 801. The output DLCI value is the same as that supposed to be obtained when a packet belonging to the same stream is received from the upstream node 502, because of the stream merge function in the node 503. The node 503 also decrements the TTL value of the generic label header by four in the example of FIGS. 6(a)–6(d), as indicated in the label information table 801.

Conversely, if the type of upstream label of the node 508 is a frame relay DLCI, the node 503 recognizes that the type of upstream label is the same as that of the downstream label of the node 504, and determines that the node 503 is not going to perform TTL processing of the generic label header. Thus, the hop-count information Ho=5(=4+1) is newly stored and notified, together with the label value, to the upstream node 508 by using the label mapping message. This enables the upstream node 508 to send a packet with a TTL value decremented appropriately in advance.

In this case, when the packet is actually transferred from the node 508, the node 503 refers to the DLCI value of the received frame relay header so as to determine the output interface and the output DLCI value for the frame to be transferred to the downstream node 504, by searching the label information table 801. However, the information concerning the number to be decremented is not described in the label information table 801 as indicated "—" in FIG. 8, and the TTL value of the generic label header is not processed in the node 503 regarding packets belonging to the stream and received from the node 508.

In this manner, when an LSP is merged at a certain node, the TTL value of the generic label header may be processed or may not be processed according to from which upstream node a labeled frame is transferred to the certain node, though the frame provided with the same label is transferred to the same downstream node. The determination can be made based on a combination of the type of upstream label and the type of downstream label as described above.

Although unicast communications are performed in the foregoing embodiment, the present invention is applicable to multicast communications by slightly modifying the control procedure. An example of such a modification is as follows.

Figure 15A:
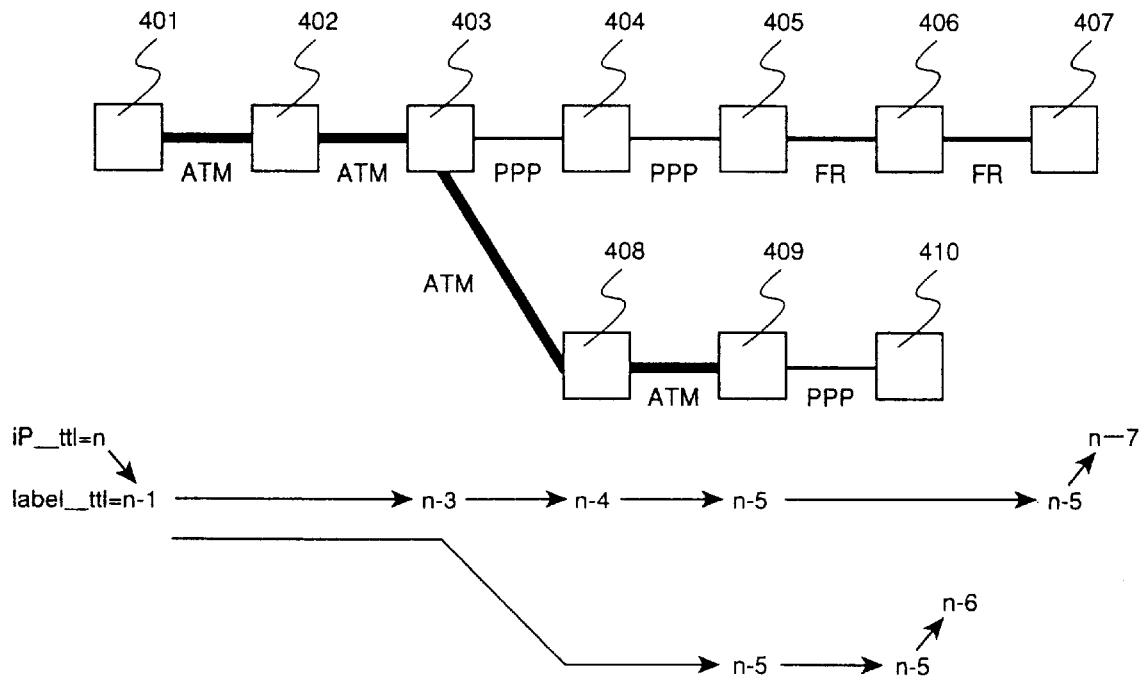
FIGS. 15(a) and 15(b) illustrate an exemplary control procedure including TTL processing employed in a case where multicast communications are performed in a network including segments that perform switching by using a label value of the generic label header and segments that perform switching by using a label value of the layer-2 header.

FIG. 15(a) illustrates a network configuration which is modified by providing additional nodes 408, 409, and 410 in the network configuration shown in FIG. 4(a). In this network, a point-to-multipoint (one-to-two in this example) LSP is utilized for layer-3 multicast communication. The main difference of the multicast LSP from unicast LSPs (point-to-point LSP, and multipoint-to-point LSP) is the position in the LSP of the node at which the TTL value of the generic label header is decremented.

In the case of unicast communications, when a series of k nodes that do not perform TTL processing exists downstream of a certain node of an LSP, the certain node decrements the TTL value by a number (k+1) in advance. In the case of multicast communications, however, it may be difficult to apply this decrementing technique, since the number of hops from a certain node to a node subsequently performing TTL processing on one blanched link of an LSP and that on another branched link of the LSP may be different. Accordingly, when a series of k nodes that do not perform TTL processing exists upstream of a certain node of an LSP, the certain node decrements the TTL value by a number (k+1) later. An example of the LDP which implements this technique is as follows.

Figure 15B:
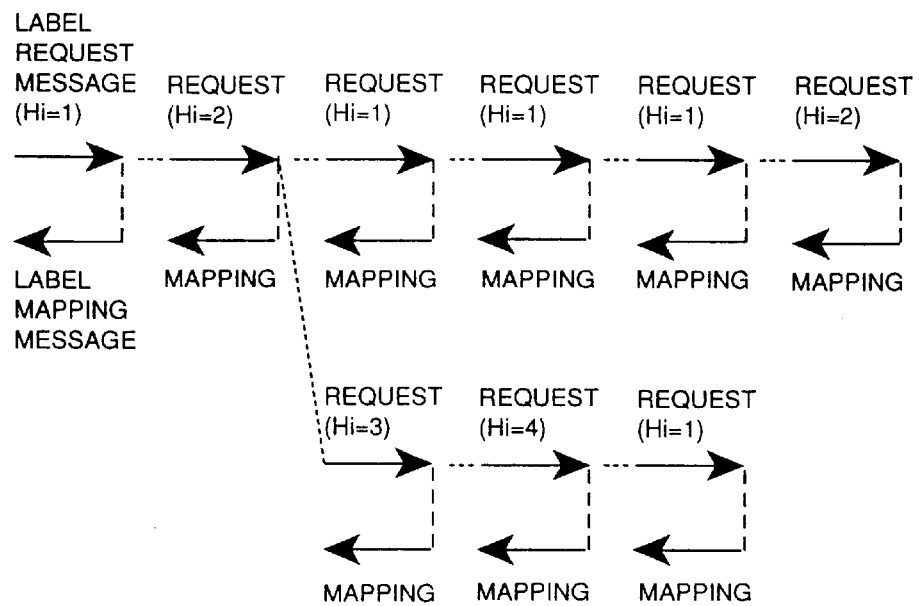

According to the procedure in which a label request message is transferred from the ingress node to the egress node of an LSP and a label mapping message is sent back from the egress node to the ingress node, as shown in FIG. 15(b), the information regarding the number of hops to be decremented is included in the label request message. Upon receiving the label request message including the hop-count information Hi=1 from the ingress node 401, the node 402 recognizes that both upstream label and downstream label are ATM labels, and transmits the label request message having the hop-count information Hi=2(=1+1) to the node 403.

The LSP is branched off at the node 403 in the directions of the node 404 and the node 408. Since the downstream label is the generic label (of a PPP link) in the direction of the node 404, TTL processing of the generic label header is to be performed in the node 404. Thus, the node 403 transmits the label request message having the hop-count information Hi=1 to the node 404. In contrast, since the downstream label is an ATM label in the direction of the node 408, TTL processing of the generic label header is not to be executed in the node 408. Accordingly, the node 403 transmits the label request message having the hop-count information Hi=3(=2+1) to the node 408.

The node 408 passes the label request message onto the node 409 by changing the hop-count information Hi=3 to Hi=4 (=3 +1). The node 404 passes the label request message to the node 405 by maintaining the hop-number information Hi=1. The procedure is repeated in this manner until the message reaches the egress nodes of the respective directions.

The determination as to whether the hop-count information Hi=1 (or no hop-count information) is to be included, or the hop-count information obtained by incrementing the Hi value received from the upstream node by one is to be included, in the label request message to be transmitted to the downstream nodes, can be made according to a procedure similar to that shown in FIG. 10. If it is determined that the node performs TTL processing of the generic label header, the former case is applied. Otherwise, the latter case is applied.

Thus, upon receiving a labeled frame (in this example, an ATM cell) from the node 402, the node 403 at which the LSP is branched off determines the output interfaces connected with the nodes 404 and 408 by checking the label information table 801. For the labeled frame to be transferred to the node 404, the number (in this case, two) by which the TTL value is to be decremented is obtained from the label information table 801. Thus, into the generic label header of the frame to be output to the node 404, the node 403 writes the output label and the TTL value decremented by two, which represents the number of nodes (402) which do not perform TTL processing upstream of the node 403 in addition to the node 403 itself. For the labeled frame to be transferred to the node 408, the number by which TTL value is to be decremented is not described in the label information table 801, since TTL processing of the generic label header of the frame to be output to the node 408 is not executed. TTL processing is not executed at the node 408, since both input label and output label are ATM labels. Then, its downstream node 409 decrements the TTL value because the input label is an ATM label and the out put label is the generic label.

In this case, the TTL value is decremented by four, since Hi=4 included in the label request message has been stored. This number four represents the number of nodes (402, 403, and 408) that do not perform TTL processing upstream of the node 409 in addition to the node 409 itself.

Figure 16A:
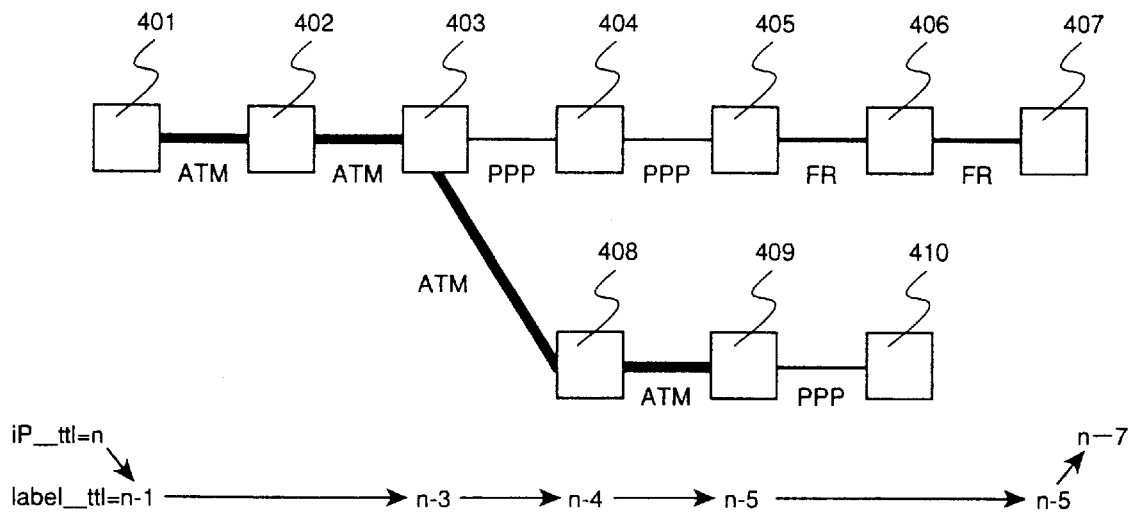
FIGS. 16(a) and 16(b) illustrate another exemplary control procedure including TTL processing employed in a case where multicast communications are performed in a network including segments that perform switching by using a label value of the generic label header and segments that perform switching by using a label value of the layer-2 header.
Figure 16B:
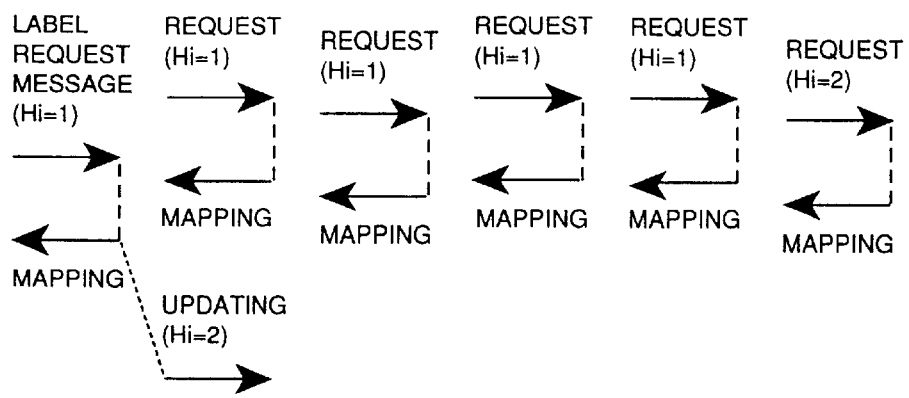

When the label assigning procedure is conducted independently between neighboring nodes, as illustrated in FIGS. 16(a) and 16(b);, information relating to the hop-count is also included in the label request message by each node. If, however, the node receives a new label request message transmitted from the upstream node, the node updates the hop-count information which was previously sent to the downstream node, as illustrated in FIG. 16(b). When reporting the updated hop-count information to the downstream node, an updating message, which is newly defined for informing a correct hop-count value, may be transmitted, or a label request message may be re-transmitted by including the updated hop-count information. The determination as to whether a message containing new hop-count (which is two or greater) information is transmitted, can be made by a procedure similar to that shown in FIG. 10.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual functions described in the above-described embodiments may be achieved by either software or hardware, or any combination of software and hardware. For example, the control message processors 1303 and 1402, the LSP-status managers 1302 and 1401, and the packet processor 1304, shown in FIGS. 13 and 14, may be suitably implemented by software, and the procedures explained with reference to FIGS. 9 through 12 may also be conveniently implemented by software. Also, the above-described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art. Such a software package can be a computer program product that employs a storage medium including stored computer code which is used to program a computer to perform the disclosed function and process of the present invention.

In addition to those already mentioned above, persons of ordinary skill will realize that many modifications and variations of the above embodiments may be made without departing from the novel and advantageous features of the present invention.

Accordingly, all such modifications and variations are intended to be included within the scope of the appended claims. The specification and examples are only exemplary. The following claims define the true scope and spirit of the invention.

What is claimed is:

1. A method of managing a hop-count of a label switched path in a network, the label switched path being configured by a plurality of nodes for performing a label switching operation on a packet by using an input label and an output label assigned to a packet stream including the packet, said method comprising steps of:

determining, by each of the plurality of nodes, whether or not said each of the plurality of nodes is to update information included in the packet when performing the label switching operation on the packet, the information being to represent how many nodes through which the packet has passed;

transmitting, by each of a first type of nodes among the plurality of nodes which determine not to update said information, when said each of the first type of nodes is notified of a hop-count regarding the label switched path by a first neighboring node on one of an upstream side and a downstream side of said each of the first type of nodes, a first message including an incremented hop-count obtained by incrementing the hop-count notified regarding the label switched path, to a second neighboring node on another one of the upstream side and the downstream side; and transmitting, by each of a second type of nodes among the plurality of nodes which determine to update said information, a second message indicating that said each of the second type of nodes is to update said information, to the second neighboring node.

2. The method according to claim 1, further comprising a step of:

transferring, by said each of the second type of nodes, the packet received from an upstream node on the upstream side to a downstream node on the downstream side by performing the label switching operation on the packet and by updating the information included in the packet based on the incremented hop-count, when said each of the second type of nodes has received the first message as the second neighboring node.

3. The method according to claim 1, further comprising a step of:

transferring, by said each of the second type of nodes, the packet received from an upstream node on the upstream side to a downstream node on the downstream side by performing the label switching operation on the packet and by updating the information included in the packet based on a default value, when said each of the second type of nodes has received the second message as the second neighboring node.

4. The method according to claim 1, further comprising a step of:

transferring, by said each of the first type of nodes, the packet received from an upstream node on the upstream side to a downstream node on the downstream side by performing the label switching operation on the packet without updating said information.

5. The method according to claim 1, wherein the transmitting step by said each of the second type of nodes transmits the second message including a default hop-count.

6. The method according to claim 1, wherein the determining step by said each of the plurality of nodes determines to update said information, when any one of the input label and the output label is to be written into a header of the packet, the header containing said information.

7. The method according to claim 1, wherein the determining step by said each of the plurality of nodes determines not to update said information, when both the input label and the output label are to be written into a first header of the packet, the first header being different from a second header containing said information.

8. The method according to claim 1, wherein the determining step by said each of the plurality of nodes determines to update said information, when a type of the input label and a type of the output label are different from each other.

9. The method according to claim 1, wherein at least one of the plurality of nodes operates as the first type of nodes for one packet to be transferred from one upstream node and operates as the second type of nodes for another packet to be transferred from another upstream node, said one packet and said another packet belonging to the packet stream.

10. The method according to claim 1, wherein at least one of the plurality of nodes operates as the first type of nodes for one packet to be transferred to one downstream node and operates as the second type of nodes for another packet to be transferred to another downstream node, said one packet and said another packet belonging to the packet stream.

11. The method according to claim 1, wherein at least one of the second type of nodes receives, as the second neighboring node, the first message from one first neighboring node and the second message from another first neighboring node, said one first neighboring node and said another first neighboring node being on the label switched path for the packet stream.

12. The method according to claim 1, wherein at least one of the second type of nodes receives, as the second neighboring node, one first message including one incremented hop-count from one first neighboring node and another first message including another incremented hop-count from another first neighboring node, said one first neighboring node and said another first neighboring node being on the label switched path for the packet stream.

13. The method according to claim 1, wherein at least one of the upstream side and the downstream side of said each of the second type of nodes is a LAN.

14. The method according to claim 1, wherein both of the upstream side and the downstream side of said each of the first type of nodes is an ATM or frame relay.

15. The method according to claim 1, wherein one of the upstream side and the downstream side of said each of the second type of nodes is an ATM and another of the upstream side and the downstream side of said each of the second type of nodes is a frame relay.

* * * * *